(12) United States Patent
Masuda et al.

(10) Patent No.: US 11,655,157 B2
(45) Date of Patent: *May 23, 2023

(54) FUNCTIONAL STRUCTURAL BODY AND METHOD FOR MAKING FUNCTIONAL STRUCTURAL BODY

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Kojiro Inamori, Tokyo (JP); Hiroko Takahashi, Tokyo (JP); Yuichiro Banba, Tokyo (JP); Kaori Sekine, Tokyo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,636

(22) Filed: Nov. 27, 2019

(65) Prior Publication Data
US 2020/0115248 A1    Apr. 16, 2020

Related U.S. Application Data

(63) Continuation of application No. PCT/JP2018/021081, filed on May 31, 2018.

(30) Foreign Application Priority Data

May 31, 2017    (JP) .............................. JP2017-108590

(51) Int. Cl.
B01J 29/06    (2006.01)
C01B 39/02    (2006.01)
(Continued)

(52) U.S. Cl.
CPC ............. C01B 39/026 (2013.01); B01J 23/06 (2013.01); B01J 23/10 (2013.01); B01J 23/16 (2013.01);
(Continued)

(58) Field of Classification Search
CPC .. B01J 29/035; B01J 29/0308; B01J 29/0352; B01J 29/0354; B01J 29/0356; B01J 29/0358; B01J 29/041; B01J 29/044; B01J 29/043; B01J 29/064; B01J 29/068; B01J 29/072; B01J 29/076; B01J 29/085; B01J 29/10; B01J 29/12; B01J 29/14; B01J 29/16; B01J 29/185; B01J 29/20; B01J 29/22; B01J 29/24; B01J 29/26; B01J 29/42; B01J 29/44; B01J 29/46; B01J 29/48; B01J 29/405; B01J 29/605; B01J 29/61; B01J 29/62; B01J 29/63; B01J 29/64; B01J 29/655; B01J 29/66; B01J 29/67; B01J 29/68; B01J 29/69; B01J 29/7007; B01J 29/7057; B01J 29/7038; B01J 29/7088; B01J 29/7615; B01J 29/7676; B01J 29/7815; B01J 29/7876; B01J 29/7415; B01J 29/7215; B01J 29/7476; B01J 29/7276; B01J 2229/22; B01J 2229/40; B01J 2229/38; B01J 2229/126; B01J 2229/20; B01J 2229/32; B01J 2229/34; B01J 35/006; B01J 35/0066; B01J 35/026; B01J 35/023; B01J 35/0073; B01J 35/0046; B01J 35/1057; B01J 37/0018; B01J 37/0072; B01J 37/0201; B01J 37/0207; B01J 37/0203; B01J 37/0205; B01J 37/10; B01J 37/08;
(Continued)

(56) References Cited

U.S. PATENT DOCUMENTS 3,898,180 A    8/1975    Crooks et al.
4,552,855 A    11/1985   Ozin et al.
(Continued)

FOREIGN PATENT DOCUMENTS

AU    2012324802 A1    6/2014
CA    2256515 A1    12/1997
(Continued)

OTHER PUBLICATIONS

Machine Translation, CN 102247887, Nov. 2011.*
(Continued)

*Primary Examiner* — Elizabeth D Wood
(74) *Attorney, Agent, or Firm* — Dorsey & Whitney LLP

(57) ABSTRACT

A functional structural body that can realize a prolonged life time by suppressing the decrease in function and that can fulfill resource saving without requiring a complicated replacement operation is provided. A functional structural body includes a skeletal body of a porous structure composed of a zeolite-type compound; and at least one solid acid present in the skeletal body, the skeletal body has channels connecting with each other, and the solid acid is present at least in the channels of the skeletal body.

13 Claims, 4 Drawing Sheets

(51) Int. Cl.

| | | |
|---|---|---|
| *B01J 29/18* | (2006.01) | |
| *B01J 35/02* | (2006.01) | |
| *B01J 35/10* | (2006.01) | |
| *B01J 37/02* | (2006.01) | |
| *B01J 37/10* | (2006.01) | |
| *B01J 29/035* | (2006.01) | |
| *B01J 29/04* | (2006.01) | |
| *B01J 37/08* | (2006.01) | |
| *B01J 29/12* | (2006.01) | |
| *B01J 29/03* | (2006.01) | |
| *B01J 29/14* | (2006.01) | |
| *B01J 29/072* | (2006.01) | |
| *B01J 29/08* | (2006.01) | |
| *B01J 29/20* | (2006.01) | |
| *B01J 29/24* | (2006.01) | |
| *B01J 29/064* | (2006.01) | |
| *B01J 29/10* | (2006.01) | |
| *B01J 29/076* | (2006.01) | |
| *B01J 29/44* | (2006.01) | |
| *B01J 29/42* | (2006.01) | |
| *B01J 29/16* | (2006.01) | |
| *B01J 29/22* | (2006.01) | |
| *B01J 29/65* | (2006.01) | |
| *B01J 29/48* | (2006.01) | |
| *B01J 29/40* | (2006.01) | |
| *B01J 29/64* | (2006.01) | |
| *B01J 29/61* | (2006.01) | |
| *B01J 29/63* | (2006.01) | |
| *B01J 29/46* | (2006.01) | |
| *B01J 29/26* | (2006.01) | |
| *B01J 29/62* | (2006.01) | |
| *B01J 29/60* | (2006.01) | |
| *B01J 29/70* | (2006.01) | |
| *B01J 29/66* | (2006.01) | |
| *B01J 29/69* | (2006.01) | |
| *B01J 29/68* | (2006.01) | |
| *B01J 29/76* | (2006.01) | |
| *B01J 29/67* | (2006.01) | |
| *B01J 29/72* | (2006.01) | |
| *B01J 29/78* | (2006.01) | |
| *B01J 29/74* | (2006.01) | |
| *B01J 23/32* | (2006.01) | |
| *B01J 23/34* | (2006.01) | |
| *B01J 23/36* | (2006.01) | |
| *B01J 23/38* | (2006.01) | |
| *B01J 23/06* | (2006.01) | |
| *B01J 23/10* | (2006.01) | |
| *B01J 23/16* | (2006.01) | |
| *B01J 23/745* | (2006.01) | |
| *B82Y 30/00* | (2011.01) | |

(52) U.S. Cl.
CPC .............. *B01J 23/32* (2013.01); *B01J 23/34* (2013.01); *B01J 23/36* (2013.01); *B01J 23/38* (2013.01); *B01J 23/745* (2013.01); *B01J 29/035* (2013.01); *B01J 29/0308* (2013.01); *B01J 29/0352* (2013.01); *B01J 29/0354* (2013.01); *B01J 29/0356* (2013.01); *B01J 29/0358* (2013.01); *B01J 29/041* (2013.01); *B01J 29/043* (2013.01); *B01J 29/044* (2013.01); *B01J 29/064* (2013.01); *B01J 29/072* (2013.01); *B01J 29/076* (2013.01); *B01J 29/085* (2013.01); *B01J 29/10* (2013.01); *B01J 29/12* (2013.01); *B01J 29/14* (2013.01); *B01J 29/16* (2013.01); *B01J 29/18* (2013.01); *B01J 29/185* (2013.01); *B01J 29/20* (2013.01); *B01J 29/22* (2013.01); *B01J 29/24* (2013.01); *B01J 29/26* (2013.01); *B01J 29/405* (2013.01); *B01J 29/42* (2013.01); *B01J 29/44* (2013.01); *B01J 29/46* (2013.01); *B01J 29/48* (2013.01); *B01J 29/605* (2013.01); *B01J 29/61* (2013.01); *B01J 29/62* (2013.01); *B01J 29/63* (2013.01); *B01J 29/64* (2013.01); *B01J 29/65* (2013.01); *B01J 29/655* (2013.01); *B01J 29/66* (2013.01); *B01J 29/67* (2013.01); *B01J 29/68* (2013.01); *B01J 29/69* (2013.01); *B01J 29/70* (2013.01); *B01J 29/7007* (2013.01); *B01J 29/7038* (2013.01); *B01J 29/7057* (2013.01); *B01J 29/7088* (2013.01); *B01J 29/7215* (2013.01); *B01J 29/7276* (2013.01); *B01J 29/7415* (2013.01); *B01J 29/7476* (2013.01); *B01J 29/7676* (2013.01); *B01J 29/7815* (2013.01); *B01J 29/7876* (2013.01); *B01J 35/023* (2013.01); *B01J 35/10* (2013.01); *B01J 35/1057* (2013.01); *B01J 37/0201* (2013.01); *B01J 37/0207* (2013.01); *B01J 37/08* (2013.01); *B01J 37/10* (2013.01); *B01J 2229/126* (2013.01); *B01J 2229/18* (2013.01); *B01J 2229/20* (2013.01); *B01J 2229/22* (2013.01); *B01J 2229/32* (2013.01); *B01J 2229/34* (2013.01); *B01J 2229/37* (2013.01); *B01J 2229/38* (2013.01); *B01J 2229/40* (2013.01); *B82Y 30/00* (2013.01); *Y02P 30/20* (2015.11); *Y02P 30/40* (2015.11)

(58) Field of Classification Search
CPC ...... B01J 37/105; B01J 35/1061; Y02P 30/20; Y02P 30/40; C10G 2300/70
USPC ........ 502/60, 63, 64, 65, 66, 69, 71, 73, 74, 502/77, 78, 79
See application file for complete search history.

(56) References Cited

U.S. PATENT DOCUMENTS

| | | | |
|---|---|---|---|
| 5,026,673 | A | 6/1991 | Gates et al. |
| 5,236,575 | A | 8/1993 | Bennett et al. |
| 5,275,720 | A | 1/1994 | Ward |
| 5,849,652 | A | 12/1998 | Davies et al. |
| 5,994,603 | A | 11/1999 | Mohr et al. |
| 6,040,259 | A | 3/2000 | Mohr et al. |
| 6,831,203 | B1 | 12/2004 | Mohr et al. |
| 6,881,703 | B2 | 4/2005 | Cutler et al. |
| 7,074,373 | B1 | 7/2006 | Warren et al. |
| 7,592,291 | B2 | 9/2009 | Rollins et al. |
| 7,893,311 | B2 | 2/2011 | Takamatsu et al. |
| 11,161,101 | B2 * | 11/2021 | Kato ..................... B01J 23/462 |
| 2003/0109383 | A1 | 6/2003 | Koike et al. |
| 2003/0188991 | A1 | 10/2003 | Shan et al. |
| 2004/0176245 | A1 | 9/2004 | Hagemeyer et al. |
| 2004/0192947 | A1 | 9/2004 | Chane-ching et al. |
| 2005/0201920 | A1 | 9/2005 | Shan et al. |
| 2006/0211777 | A1 | 9/2006 | Severinsky |
| 2006/0216227 | A1 | 9/2006 | Idem et al. |
| 2007/0004593 | A1 | 1/2007 | Ohno et al. |
| 2007/0167551 | A1 | 7/2007 | Goodwin et al. |
| 2008/0045400 | A1 | 2/2008 | Rollins et al. |
| 2008/0045403 | A1 | 2/2008 | Rollins et al. |
| 2008/0051280 | A1 | 2/2008 | Hagemeyer et al. |
| 2008/0072705 | A1 | 3/2008 | Chaumonnot et al. |
| 2008/0280754 | A1 | 11/2008 | Toledo et al. |
| 2008/0293990 | A1 | 11/2008 | Stevenson et al. |
| 2009/0286677 | A1 | 11/2009 | Takeshima et al. |
| 2009/0325790 | A1 | 12/2009 | Haller et al. |
| 2010/0004118 | A1 | 1/2010 | Liu et al. |

(56) References Cited

U.S. PATENT DOCUMENTS

| | | |
|---|---|---|
| 2011/0085944 A1 | 4/2011 | Rolllins et al. |
| 2011/0092356 A1 | 4/2011 | Rollins et al. |
| 2011/0092745 A1 | 4/2011 | Senoo et al. |
| 2011/0121238 A1 | 5/2011 | Wakatsuki |
| 2011/0293941 A1 | 12/2011 | Chaumonnot et al. |
| 2012/0042631 A1 | 2/2012 | Schmieg et al. |
| 2012/0060472 A1 | 3/2012 | Li et al. |
| 2012/0130138 A1 | 5/2012 | Yamaguchi et al. |
| 2012/0142238 A1 | 6/2012 | Saitou et al. |
| 2012/0231948 A1 | 9/2012 | Saito |
| 2013/0041174 A1 | 2/2013 | Yamamoto et al. |
| 2013/0090445 A1 | 4/2013 | Hattori et al. |
| 2014/0021096 A1 | 1/2014 | Chaumonnot et al. |
| 2014/0128246 A1 | 5/2014 | Garcia-martinez |
| 2014/0147362 A1 | 5/2014 | Sasaki et al. |
| 2014/0284524 A1 | 9/2014 | Lee et al. |
| 2014/0303266 A1* | 10/2014 | Hyman ............... B01J 35/0006 518/713 |
| 2015/0018590 A1 | 1/2015 | Stevenson et al. |
| 2015/0290635 A1 | 10/2015 | Inokawa et al. |
| 2015/0367332 A1 | 12/2015 | Kuvettu et al. |
| 2016/0017238 A1 | 1/2016 | Stamires et al. |
| 2016/0023913 A1 | 1/2016 | Goel et al. |
| 2016/0024400 A1 | 1/2016 | Iwasa et al. |
| 2016/0030934 A1 | 2/2016 | Zhan et al. |
| 2016/0032202 A1 | 2/2016 | Yonemura et al. |
| 2016/0087285 A1 | 3/2016 | Watanabe et al. |
| 2016/0114314 A1 | 4/2016 | Ali et al. |
| 2016/0137516 A1 | 5/2016 | Kegnæs et al. |
| 2016/0369174 A1 | 12/2016 | Kool et al. |
| 2017/0036197 A1 | 2/2017 | Kegnæs et al. |
| 2018/0194700 A1 | 7/2018 | Pan et al. |
| 2019/0039056 A1 | 2/2019 | Kato et al. |
| 2020/0094229 A1 | 3/2020 | Masuda et al. |
| 2020/0094232 A1 | 3/2020 | Masuda et al. |
| 2020/0108374 A1 | 4/2020 | Masuda et al. |
| 2020/0108378 A1 | 4/2020 | Masuda et al. |
| 2020/0114335 A1 | 4/2020 | Masuda et al. |
| 2020/0114336 A1 | 4/2020 | Masuda et al. |
| 2020/0114337 A1 | 4/2020 | Masuda et al. |
| 2020/0114338 A1 | 4/2020 | Masuda et al. |
| 2020/0114339 A1 | 4/2020 | Masuda et al. |
| 2020/0114341 A1 | 4/2020 | Masuda et al. |
| 2020/0115640 A1 | 4/2020 | Masuda et al. |
| 2020/0254432 A1 | 8/2020 | Shirman et al. |

FOREIGN PATENT DOCUMENTS

| | | | |
|---|---|---|---|
| CN | 1223602 A | | 7/1999 |
| CN | 1720098 A | | 1/2006 |
| CN | 1729138 A | | 2/2006 |
| CN | 1876766 A | | 12/2006 |
| CN | 101130466 A | | 2/2008 |
| CN | 101180125 A | | 5/2008 |
| CN | 101362959 A | | 2/2009 |
| CN | 101720252 A | | 6/2010 |
| CN | 101909750 A | | 12/2010 |
| CN | 102056869 A | | 5/2011 |
| CN | 102099114 A | | 6/2011 |
| CN | 102247887 A | | 11/2011 |
| CN | 102400744 A | | 4/2012 |
| CN | 102574120 A | | 7/2012 |
| CN | 102844115 A | | 12/2012 |
| CN | 103459012 A | | 12/2013 |
| CN | 103663490 A | | 3/2014 |
| CN | 103889577 A | | 6/2014 |
| CN | 104650291 A | | 5/2015 |
| CN | 105008492 A | | 10/2015 |
| CN | 105347359 A | | 2/2016 |
| CN | 106362787 A | | 2/2017 |
| EP | 0485180 A1 | | 5/1992 |
| EP | 1709125 A1 | | 10/2006 |
| EP | 2484444 A1 | | 8/2012 |
| EP | 2692439 A1 | | 2/2014 |
| EP | 2992984 A1 | | 3/2016 |
| JP | S5746925 A | | 3/1982 |
| JP | H0549943 A | * | 3/1993 |
| JP | H06-142456 A | | 5/1994 |
| JP | H07-096195 A | | 4/1995 |
| JP | H08155303 A | | 6/1996 |
| JP | H1133412 A | | 2/1999 |
| JP | H11151440 A | | 6/1999 |
| JP | 2000197822 A | | 7/2000 |
| JP | 2000511107 A | | 8/2000 |
| JP | 2000323164 A | | 11/2000 |
| JP | 2002255537 A | | 9/2002 |
| JP | 2002336704 A | | 11/2002 |
| JP | 2004528158 A | | 9/2004 |
| JP | 2005170903 A | | 6/2005 |
| JP | 2005189586 A | | 7/2005 |
| JP | 2005270734 A | | 10/2005 |
| JP | 2005314208 A | | 11/2005 |
| JP | 2006021994 A | | 1/2006 |
| JP | 2007130525 A | | 5/2007 |
| JP | 2007519799 A | | 7/2007 |
| JP | 2008012382 A | | 1/2008 |
| JP | 2008542177 A | | 11/2008 |
| JP | 2009505830 A | | 2/2009 |
| JP | 2009255014 A | | 11/2009 |
| JP | 2010501496 A | | 1/2010 |
| JP | 2010099638 A | | 5/2010 |
| JP | 2010527769 A | | 8/2010 |
| JP | 2011517439 A | | 6/2011 |
| JP | 4879574 B2 | | 2/2012 |
| JP | 2012153654 A | | 8/2012 |
| JP | 2012170951 A | | 9/2012 |
| JP | 2012210557 A | | 11/2012 |
| JP | 2013255911 A | | 12/2013 |
| JP | 2014104428 A | | 6/2014 |
| JP | 2014534902 A | | 12/2014 |
| JP | 5700376 B2 | | 4/2015 |
| JP | 2015165138 A | | 9/2015 |
| JP | 2015189586 A | | 11/2015 |
| JP | 2016002527 A | | 1/2016 |
| JP | 2016064407 A | | 4/2016 |
| JP | 2016069318 A | | 5/2016 |
| JP | 2016087522 A | | 5/2016 |
| JP | 2016529190 A | | 9/2016 |
| JP | 2017039218 A | | 2/2017 |
| JP | 2017064647 A | | 4/2017 |
| JP | 2017509732 A | | 4/2017 |
| JP | 2017128480 A | | 7/2017 |
| WO | 9745197 A1 | | 12/1997 |
| WO | 9745387 A1 | | 12/1997 |
| WO | 2005083014 A1 | | 9/2005 |
| WO | 2007000847 A1 | | 1/2007 |
| WO | 2007023558 A1 | | 3/2007 |
| WO | 2009096548 A1 | | 8/2009 |
| WO | 2010097108 A1 | | 9/2010 |
| WO | 2010097224 A2 | | 9/2010 |
| WO | 2011065194 A1 | | 6/2011 |
| WO | 2012105581 A1 | | 8/2012 |
| WO | 2012170421 A1 | | 12/2012 |
| WO | 2013057319 A2 | | 4/2013 |
| WO | 2013115213 A1 | | 8/2013 |
| WO | 2014083772 A1 | | 6/2014 |
| WO | 2014132367 A1 | | 9/2014 |
| WO | 2015001123 A1 | | 1/2015 |
| WO | 2015155216 A1 | | 10/2015 |
| WO | 2016014691 A1 | | 1/2016 |
| WO | 2016181622 A1 | | 11/2016 |
| WO | 2017000427 A1 | | 1/2017 |
| WO | 2017072698 A1 | | 5/2017 |

OTHER PUBLICATIONS

Do et al., "Zeolite Nanoclusters Coated onto the Mesopore Walls of SBA-15", J. Am. Chem. Soc. 2004, 126, phs. 14324-14325.*

English translation of International Preliminary Report on Patentability for Application No. PCT/JP2018/021081, dated Dec. 3, 2019.

(56) References Cited

OTHER PUBLICATIONS

English translation of Written Opinion for Application No. PCT/JP2018/021081, dated Apr. 9, 2018.
International Search Report (EN translation of ISR only) and Written Opinion for Application No. PCT/JP2018/021081, dated Sep. 4, 2018.
Fujikawa, Takashi , "Current Status and Future Prospects of Petroleum Refining Catalysts", The Nikkan Kogyo Shimbun, Ltd., vol. 65, No. 1, Jan. 1, 2017, p. 22.
Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.
Haruta, Masatake , "Low-Temperature Combustion Catalysts Mainly for CO Oxidation", Journal of The Japan Petroleum Institute, vol. 37, No. 5, Sep. 1, 1994, pp. 480-491.
Ichikawa, Masaru et al., "Advanced Technology of Methane Chemical Conversion", CMC Publishing Co., Ltd., Jan. 2008.
Ismagilov, Z.R. et al., "Structural Changes of MO/ZSM-5 Catalysts During the Ethane Dehydroaromatization", Eurasian Chemico-Technological Journal, Journal 12, Nov. 2009, 9-16.
Laprune, David et al., "Highly Dispersed Nickel Particles Encapsulated in Multi-Hollow Silicalite-1 Single Crystal Nanoboxes: Effects of Siliceous Deposits and Phosphorous Species on the Catalytic Performances", ChemCatChem, vol. 9, Issue 12, dated Feb. 18, 2017, pp. 2297-2307.
Muroi, Takajyo , "Development Trends of Methane Chemistry Catalysts", Catalyst Round-table Conference News, No. 96, Nov. 1, 2016.
Muroi, Takashiro , "Reverse Water Gas Shift Catalysts", Industrial Catalyst News, No. 107, Aug. 1, 2017, 2 pages.
Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.
Wu, Zhijie et al., "Hydrothermal Synthesis of LTA-Encapsulated Metal Clusters and Consequences for Catalyst Stability, Reactivity, and Selectivity", Journal of Catalysis, vol. 311, dated Jan. 31, 2014, pp. 458-468.
English machine translation of CN 106362787 A, entitled "Preparation method for zeolite-immobilized photocatalyst" dated Feb. 1, 2017.
English machine translation of JP 2002255537 A entitled "Solid Acid Catalyst" dated Sep. 11, 2002.
English machine translation of JP 2005314208 A entitled "Combined Porous Body and Its Manufacturing Method and Organic Substance Converting Method Using the Same" dated Nov. 10, 2005.
English machine translation of JP 2012170951 A entitled "Photocatalyst-Adsorbent Composite Powder" dated Sep. 10, 2012.
English machine translation of JP 2015165138 A entitled "Exhaust Gas Emission Control Device" dated Sep. 17, 2015.
English machine translation of JP 2016069318 A entitled "Storing Method for Secondary Alcohol and Loaded Body" dated May 9, 2016.
English machine translation of JP 2017128480 A entitled "Zeolite Including Metal Particle" dated Jul. 27, 2017.
English machine translation of JP H0549943A entitled "Oxidizing Catalyst" dated Mar. 2, 1993.
English machine translation of JPH1133412 entitled "A Production of Metal-Supporting Catalyst" dated Feb. 9, 1999.
English machine translation of WO 2007/023558 A1 entitled "Tungsten Oxide Photocatalyst, Process for Producing the Same, and Fiber Cloth Having Deodorizing/Antifouling Function" dated Mar. 1, 2007.
English machine translation of WO 2009/096548 A1 entitled "Silver-(Titanium Oxide)-Zeolite Adsorbent/Decomposing Material and Process for Production Thereof" dated Aug. 6, 2009.
English machine translation of WO 2012/105581 A1 entitled "Method for Producing Oxide Semiconductor Layer" dated Sep. 8, 2012.
Extended European Search Report received in EP App. No. 18810208.1 dated Jan. 28, 2021.
Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.
Liu, Xue et al., "Drying of Ni/Alumina Catalysts: Control of the Metal Distribution Using Surfacants and the Melt Infiltration Methods", Industrial & Engineering Chemistry Research, vol. 53, No. 14, Apr. 9, 2014, pp. 5792-5800.
Makshina, Ekaterina et al., "Methanol Oxidation on LaCo Mixed Oxide Supported Onto MCM-41 Molecular Sieve", Catalysis Today, vol. 131, No. 1, Nov. 2007, pp. 427-430.
Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.
Wang, Hong et al., "Research into eliminating particulate from diesel engine exhaust over zeolite covered with catalysts of perovskite-type oxides", 2009 International Conference on Energy and Environment Technology : ICEET 2009 ; Guilin, China, Oct. 16-18, 2009, IEEE, Piscataway, NJ, USA, Oct. 16, 2009 (Oct. 16, 2009), pp. 493-495, XP031588294, ISBN: 978-0-7695-3819-8.
Yokoi, Toshiyuki , "Characterization of Zeolites by Advanced SEM/STEM Techniques", The Hitachi Scientific Instrument News, vol. 7, Sep. 2016, pp. 17-23.
Yue, Ming B. et al., "Directly Transforming As-Synthesized MCM-41 to Mesoporous MFI Zeolite", Journal of Material Chemistry, vol. 18, No. 17, Mar. 13, 2008, p. 2044.
Zhijie, Wu et al., Hydrothermal synthesis of L TA-encapsulated metal clusters and consequences for catalyst stability, reactivity, and selectivity, Journal of Catalysis, Academic Press, Duluth, MN, US, vol. 311, Jan. 31, 2014 (Jan. 31, 2014), pp. 458-468, XP028612174, ISSN: 0021-9517, DOI: 10.1016/J.JCAT.2013.12.021.
English Translation of CN 102247887(A).
Wang, D Y. et al., Study on methane aromatization over MoO3/HMCM-49 catalyst, 2004, Catalysis Today, 93-95, Jul. 2, 2004, 75-80.
Office Action for AU Application No. 2018277967, dated May 8, 2020.
English machine translation of JP 2000-511107 A, entitled "Metal-containing zeolite catalyst, its preparation and use for the conversion of hydrocarbons".
English machine translation of JPH0796195 A, entitled "Exhaust Gas Purification Catalyst" dated Sep. 29, 1993.
https://sites.engineering.ucsb.edu/~jbraw/chemreacfun/ch7/slides-masswrxn-2up.pdf, College of Engineering, UC Santa Barbara accessed Apr. 26, 2021.
Dai, Chengyi et al., "Hollow zeolite-encapsulated Fe—Cu bimetallic catalysts for phenol degradation", Catalysis Today, Elsevier, Amsterdam, NL, vol. 297, Feb. 7, 2007 (Feb. 7, 2017), pp. 335-343, XP085215768, ISSN: 0920-5861, DOI: 10.1016/J.CATTOD.2017.02.001.
Li, Shiwen et al., "Diffusion Driven Selectivity in Oxidation of CO in Presence of Propylene Using Zeolite Nano Shell as Membrane", ACS Catalysis, vol. 4, No. 12, Dec. 2014, pp. 4299-4303.
Li, Shiwen et al., "Diffusion-Driven Selectivity in Oxidation of CO in the Presence of Propylene Using Zeolite Nano Shell as Membrane", ACS Catalysis, vol. 4, No. 12, Nov. 2014.
Cho, Hong J. et al., "Zeolite-Encapsualted Pt Nanoparticlles for Tandem Catalysis", J. Am. Chem. Soc., Sep. 24, 2018, 13514-13520.
Li, Peijun et al., "Ultrastable Perovskite-Zeolite Composite Enabled by Encapsulation and In Situ Passivation", Angewandte Chemie International Edition vol. 59, Issue 51, Sep. 5, 2020, 23300-23306.
Wang, Junwen et al., "In Situ Encapsulated Pt Nanoparticles Dispersed in Low Temperature Oxygen for Partial Oxidation of Methane to Syngas", Catalysts, Aug. 27, 2019, 720-734.
Newsam, J.M., "The Zeolite Cage Structure", Science, Mar. 7, 1986, New Series, vol. 231, No. 2742, pp. 1093-1099 (Year: 1986).

(56) References Cited

OTHER PUBLICATIONS

Do, Trong-On et al., "Zeolite Nanociusters Coated onto the Mesopore Walls of SBA-15", J. Am. Chem. Soc. vol. 126, No. 44, 2004, pp. 14324-14325.
[English Translation] Notice of Reasons for Refusal dated Mar. 16, 2022 for Japanese Patent Application No. 2019-521322; pp. all.
[English Translation] Notice of Reasons for Refusal dated Mar. 28, 2022 for Japanese Patent Application No. 2019-521324; pp. all.
[English Translation] Notice of Reasons for Refusal dated Feb. 7, 2022 for Japanese Patent Application No. 2019-521334.
[English Translation] Notice of Reasons for Refusal dated Feb. 7, 2022 for Japanese Patent Application No. 2019-521335.
[English Translation] Notice of Reasons for Refusal dated Feb. 7, 2022 for Japanese Patent Application No. JP2019-521325.
[English Translation] First Office Action dated May 16, 2022 for Chinese Patent Application No. 201880036071.3; pp. all.
[English Translation] First Office Action dated May 5, 2022 for Chinese Patent Application No. 201880036312.4; pp. all.
[English Translation] First Office Action dated May 7, 2022 for Chinese Patent Application No. 201880035210.0; pp. all.
[English Translation] Notice of Reasons for Refusal dated Jun. 6, 2022 for Japanese Patent Application No. 2019-521326; pp. all.
First Office Action dated May 6, 2022 for Australian Patent Application No. 2021202968; pp. all.
Dai, Chengyi, et al., "Hollow Zeolite encapsulated Ni—Pt bimetals for sintering and coking resistant dry reforming of methane", Journal of Materials Chemistry A, Jan. 1, 2015, 9 pages.
[Partial English Translation] Zhang, Yicheng , et al., "Advances in the catalysis of methanol to aromatics reaction", Chemical Industry and Engineering Progress, vol. 35 No. 3, Mar. 5, 2016, pp. 801-806.
[English Abstract] Zhang, Lian-Zhong , et al., "Preparation of Phenol and Acetone with Solid Acid Catalyst", [With Chemical World, Mar. 16, 2012, pp. 487-490.
[English Translation] First Office Action dated Aug. 3, 2022 for Chinese Patent Application No. 201880035569.8; pp. all.
[English Translation] First Office Action dated Aug. 3, 2022 for Chinese Patent Application No. 201880036313.9; pp. all.
[English Translation] Notice of Reasons for Refusal dated Aug. 16, 2022 for Japanese Patent Application No. 2019-521324; pp. all.
[English Translation] "Preparation and Application of Molecular Sieves", Edited by Shanghai Reagent Factory, Jun. 1976; pp. all.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] Notice of Reasons for Refusal dated Aug. 3, 2022 for Japanese Patent Application No. 2019-521322.
[English Translation] Notice of Reasons for Refusal dated Aug. 3, 2022 for Japanese Patent Application No. 2019-521331.
[English Translation] First Office Action dated Jul. 20, 2022 for Chinese Patent Application No. 201880035173.3.
[English Translation] First Office Action dated Jul. 20, 2022 for Chinese Patent Application No. 201880035360.1.
Dai, Chengyi, et al., "Synthesis of Hollow Nanocubes and Macroporous Monoliths of Silicalite-1 by Alkaline Treatment", Chemistry of Materials, Oct. 7, 2013, pp. 4197-4205.
Miao, Tao , et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.
[English Translation] First Office Action dated Jul. 5, 2022 for Chinese Patent Application No. 201880035017.7.
[English Translation] First Office Action dated Jun. 29, 2022 for Chinese Patent Application No. 201880036388.7.
[English Translation] First Office Action dated Jun. 27, 2022 for Chinese Patent Application No. 201880035525.5.
Hosseinpour, Negahdar , et al., "Cumene cracking activity and enhanced regeneration of FCC catalystscomprising HY-zeolite and LaBO3(B = Co, Mn, and Fe) perovskites". Applied Catalysis A, vol. 487,, Oct. 2014, pp. 26-35.

Laprune, David , et al., "Highly Disperesed Nickel Particles Encapsulated in Multihollow Silicalite-1 Single Crystal Nanoboxes: Effects of Siliceous Deposits and Phosphorous Species on the Catalytic Performances", ChemCatChem, Sep. 2017, pp. 2297-2307.
Liang, Wenping , et al., "Surfactant Applications in Dispersion Systems", China Light Industry Press, Feb. 2003.
Roque-Malherbe, Rolando M.A., "Adsorption and Diffusion in Nanoporous Materials", Materials Chemistry, Mar. 5, 2007.
[English Translation] First Office Action dated Apr. 20, 2022 for Chinese Patent Application No. 201880035803.7; pp. all.
[English Translation] Li, Jinlin , et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.
[English Translation] Liu, Quansheng , et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.
Cai et al. "Gold Nanoclusters Confined in a Supercage of Y Zeolite for Aerobic Oxidation of HMF under Mild Conditions", Chem. Rur. J, 2013, 19, pp. 14215-14223.
Corma et al. "A zeolite with interconnected 8-, 10-, and 12-ring pores and its unique catalytic selectivity", Nature Materials, vol. 2, Jun. 22, 2003, pp. 493-499.
Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.
Kalogeras et al. "Electrical Properties of Zeolitic Catalysts", Defect and Diffusion Forum vol. 164, Sep. 1998, pp. 1-36.
Mitra et al. "Molecular dynamics using quasielastic neutron scattering", Current Science, vol. 84, No. 5, Mar. 2003; pp. 653-662.
Nan Jiang et al. "The Adsorption Mechanisms of Organic Micropollutants on High-Silica Zeolites Causing S-Shaped Adsorption Isotherms: An Experimental and Monte Carlo Simulations Study", Chemical Engineering Journal; Nov. 2019; pp. all.
[English Translation] Notice of Reasons for Refusal dated Mar. 16, 2022 for Japanese Patent Application No. 2019-521331.
[English Translation] Saudi Arabian Office Action dated Jan. 27, 2022 for Saudi Arabian Patent Application No. 519410663.
[English Translation] Notice of Reasons for Refusal dated Jun. 28, 2022 for Japanese Patent Application No. 2019-521318; pp. all.
[English Translation] Notice of Reasons for Refusal dated Jun. 28, 2022 for Japanese Patent Application No. 2019-521319; pp. all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
Wen , et al., "Enhanced catalytic performance of Co/MFI by hydrothermal treatment", Catalysis Letters vol. 86, Nos. 1-3, Mar. 2003.
[English Translation] Notice of Reasons for Refusal for Japanese Patent Application No. 2019-521325 dated Sep. 27, 2022, pp. all.
[English Translation] Notice of Reasons for Refusal for Japanese Patent Application No. 2019-521334, dated Sep. 27, 2022, pp. all.
[English Translation] Notice of Reasons for Refusal for Japanese Patent Application No. 2019-521335, dated Sep. 27, 2022, pp. all.
[English Translation] Notice of Reasons for Refusal dated Sep. 27, 2022 for Japanese Patent Application No. 2019-521325; pp. all.
[English Translation] Notice of Reasons for Refusal dated Sep. 27, 2022 for Japanese Patent Application No. 2019-521334, pp. all.
[English Translation] Notice of Reasons for Refusal dated Sep. 27, 2022 for Japanese Patent Application No. 2019-521335, pp. all.
[English Translation] Notice of Reasons for Refusal for Japanese Patent Application No. 2019-521326 dated Nov. 25, 2022, pp. all.
[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
[English Translation] Zhong, Bangke , "Catalysis i Fine chemical process", Sinopec Press; ISBN 7-80164-251-1, Aug. 2002, 4 pages.

(56) References Cited

OTHER PUBLICATIONS

[English Translation] Second Office Action dated Dec. 23, 2022 in CN Application No. 201880035210.0; pp. all.

[English Translation] Second Office Action dated Jan. 5, 2023 in CN Application No. 201880035525.5; pp. all.

Office Action dated Dec. 18, 2022 for SA Application No. 519410677; pp. all.

Office Action dated Dec. 18, 2023 for SA Application No. 519410673; pp. all.

Office Action dated Dec. 26, 2022 for SA Application No. 519410680; pp. all.

Second Office Action dated Jan. 20, 2023 for CN Application No. 201880035360.1; pp. all.

Second Office Action dated Jan. 12, 2023 for CN Application No. 201880036382.X; pp. all.

Second Office Action dated Jan. 19, 2023 for CN Application No. 201880035017.7; pp. all.

Second Office Action dated Jan. 20, 2023 for CN Application No. 201880035026.6, pp. all.

Second Office Action dated Jan. 18, 2023 in CN Application No. 201880036313.9; pp. all.

Decision of Refusal for Japanese Patent Application No. 2019-521318, dated Feb. 1, 2023, pp. all.

Decision of Refusal for Japanese Patent Application No. 2019-521319, dated Feb. 1, 2023, pp. all.

Notice of Reasons for Refusal for Japanese Patent Application No. 2019-521320, dated Feb. 1, 2023, pp, all.

Notice of Reasons for Refusal for Japanese Patent Application No. 2019-521321, dated Feb. 1, 2023, pp. all.

[English Translation] Second Office Action dated Feb. 18, 2023 in CN Application No. 201880035173.3; pp. all.

[English Translation] Second Office Action dated Feb. 24, 2023 in CN Application No. 201880035569.8; pp. all.

[English Translation] Third Office Action dated Mar. 8, 2023 for CN Application No. 201880035803.7; pp. all.

[English Translation] Third Office Action dated Mar. 8, 2023 in CN Application No. 201880036312.4; pp. all.

[English Translation] Notice of Reasons for Refusal dated Mar. 22, 2023 in JP Application No. 2019-521324; pp. all.

[English Translation] Notice of Reasons for Refusal for Japanese Patent Application No. 2019-521322 dated Apr. 4, 2023, pp. all.

[English Translation] Notice of Reasons for Refusal for Japanese Patent Application No. 2019-521325 dated Apr. 4, 2023, pp. all.

[English Translation] Notice of Reasons for Refusal for Japanese Patent Application No. 2019-521331 dated Apr. 4, 2023, pp. all.

[English Translation] Notice of Reasons for Refusal for Japanese Patent Application No. JP-2019-521335 dated Apr. 4, 2023, pp. all.

\* cited by examiner

FUNCTIONAL STRUCTURAL BODY AND METHOD FOR MAKING FUNCTIONAL STRUCTURAL BODY

CROSS REFERENCE TO RELATED APPLICATIONS

The present application is a continuation application of International Patent Application No. PCT/JP2018/021081 filed on May 31, 2018, which claims the benefit of Japanese Patent Application No. 2017-108590, filed on May 31, 2017. The contents of these applications are incorporated herein by reference in their entirety.

TECHNICAL FIELD

The present disclosure relates to a functional structural body having a skeletal body of a porous structure and a solid acid, and a method for making the functional structural body.

BACKGROUND ART

Petrol chemical raw materials called naphtha, and various fuels such as heavy oil, light oil, kerosene, gasoline, LP gas, and the like are produced from crude oil in petroleum complexes in oil manufacturers. Since the crude oil is a mixture in which various impurities are mixed in addition to the petrochemical raw materials and the various fuels described above, a step of distilling and separating components contained in the crude oil is required.

Therefore, in a petroleum refining process, difference in boiling point of individual components is used, and the crude oil is heated at a shelf stage in a column in an atmospheric pressure distillation apparatus to separate the crude oil into the components, and then the separated components are each concentrated. As a result, a low-boiling point substance such as LP gas or naphtha is removed at an upper shelf stage of the atmospheric pressure distillation apparatus while a high-boiling point substance such as heavy oil is removed from a bottom of the atmospheric pressure distillation apparatus. Then, the concentrated components are each subjected to secondary processing such as desulfurization to produce various fuel products.

In general, petroleum reforming catalysts have been used to efficiently modify low boiling point naphtha and the like in the above petroleum refining process to produce gasoline having a high octane number and the like. The naphtha fraction in the crude oil has a low octane number as it is, and is unsuitable as the gasoline for vehicle operation. Therefore, reformed gasoline having suitable properties for fuels for vehicle is produced by reforming paraffins and naphthenes having a low octane number in the naphtha fraction to an aromatic fractions having a high octane number using petroleum reforming catalysts.

In addition, as crude oil becomes heavier, hydrocracking treatment is performed in which heavy oil is hydrodesulfurized using a hydrodesulfurization apparatus such as a direct desulfurization apparatus, an indirect desulfurization apparatus, and the like to obtain a desulfurized heavy oil, desulfurized heavy gas oil, and the like that are further decomposed to increase production of desulfurized naphtha, desulfurized kerosene, desulfurized light oil, and the like. For example, by hydrocracking atmospheric pressure distilled residual oil, the yields of the desulfurized kerosene and light oil fractions, and the desulfurized naphtha fraction are increased and the desulfurized heavy oil is decreased, and the LPG fraction, FCC gasoline fraction, and LCO fraction are produced from the desulfurized heavy oil in a catalytic cracking device, and thereby the residual oil is decreased and the light oil fraction is increased. As a catalyst used for hydrocracking treatment, a catalyst including a crystalline aluminosilicate support, which is an exemplary zeolite, and a hydrogenolysis catalyst containing zeolite and a porous inorganic oxide in a specific proportion have been proposed.

For example, in U.S. Patent Publication No. 2016/0030934, a catalyst is disclosed in which a metal made from a material selected from Pd, Pt, Co, Fe, Cr, Mo, W and mixtures thereof is deposited on the surface of a support including Y type zeolite as a hydrogenolysis catalyst.

Furthermore, in U.S. Patent Publication No. 2003/0109383, as a catalyst structural body for exhaust emissions of a vehicle equipped with a diesel engine, a ceramic catalyst body is proposed in which a ceramic support is disposed on a ceramic surface of a substrate, and a ceramic catalyst body that supports both a main catalyst component and a co-catalyst component on the ceramic support is disclosed. In this ceramic catalyst body, a large number of pores formed from lattice defects and the like in the crystal lattice are formed in the surface of a ceramic support made of $\gamma$-alumina, and a main catalyst component including Ce—Zr, Pt, and the like is directly supported near the surface of the ceramic support.

In recent years, zeolites have been used as solid acid catalysts for producing lower olefins such as ethylene, propylene, and the like. For example, in Japanese Patent No. 5700376 B, a composite comprising at least one of a proton type silicalite and an ammonium type silicalite as a first component, an alkaline earth metal compound as a second component, and a non-zeolite compound containing at least one of an oxide and a hydroxide of aluminum as a third component, as a catalyst used for producing propylene by contacting an olefin having 4 or more carbon atoms with an oxygen-containing compound, is disclosed. Furthermore, Japanese Patent No. 4879574 B discloses a zeolite-containing molded body catalyst as a catalyst used in the production of ethylene and propylene from hydrocarbon raw materials containing olefins having a carbon number of 4 to 12 (Japanese Patent No. 4879574 B).

SUMMARY OF DISCLOSURE

Technical Problem

However, in the catalyst structural body described in U.S. Patent Publication Nos. 2016/0030934 and 2003/0109383, since the catalyst particles are supported on or near the surface of the support, the catalyst particles move from the surface of the support or the vicinity of the surface due to the effects of the force, heat, and the like received from the fluid such as the reformed material during the reforming process, and the aggregation of the catalyst particles (sintering) easily occurs within the support. When aggregation occurs between catalyst particles, the catalytic activity decreases due to the reduction in effective surface area as a catalyst, and therefore the life time of the catalyst structural body becomes shorter than normal. Therefore, the catalyst structural body itself must be replaced or regenerated over a short period of time, which leads to the problem that the replacement operation is cumbersome and resource saving cannot be achieved. Furthermore, since petroleum reforming catalysts are typically connected to the downstream side of the atmospheric pressure distillation apparatus and are used continuously in a petroleum refining process, it is difficult to apply the catalyst reactivation technique. Even if the catalyst reactivation technique can be applied, the work is very complicated. The suppression or prevention of such a deterioration of the function over time is not only a problem in the catalytic field, but also in a variety of technical fields.

Furthermore, as disclosed in Japanese Patent Nos. 4879574 B and 4879574 B, when zeolites are used as solid acid catalysts, it is known that the catalytic function of the zeolite is deactivated over time. The cause of this is that the aluminum element in the skeletal structure is removed by water steam or the like generated during the reaction, and the cokes that precipitate in association with the reaction adhere to the aluminum element, and the like.

An object of the present disclosure is to provide a functional structural body that can realize a prolonged life time by suppressing the decrease in function of the solid acid and that can fulfill resource saving without requiring a complicated replacement operation, and a method for making the functional structural body.

Solution to Problem

As a result of diligent research to achieve the object described above, the present inventors have found that a functional structural body that can realize a prolonged life time by suppressing the decrease in function of the solid acid is obtained by including a skeletal body of a porous structure composed of a zeolite-type compound, and at least one solid acid present in the skeletal body, the skeletal body having channels connecting with each other, and the solid acid being present at least in the channels of the skeletal body, and thus completed the present disclosure based on such finding.

Namely, the main configurations of the present disclosure are as follows.

[1] A functional structural body, including:
a skeletal body of a porous structure composed of a zeolite-type compound; and
at least one solid acid present in the skeletal body,
the skeletal body having channels connecting with each other, and
the solid acid being present at least in the channels of the skeletal body.

[2] The functional structural body according to [1], wherein the channels have an enlarged pore portion, and the solid acid is at least embedded by the enlarged pore portion.

[3] The functional structural body according to [2], wherein the enlarged pore portion causes a plurality of pores constituting any one of a one-dimensional pore, a two-dimensional pore, and a three-dimensional pore to connect with each other.

[4] The functional structural body according to [1], wherein the solid acid is nanoparticles having catalytic function, and the skeletal body is a support that supports the solid acid.

[5] The functional structural body according to [4], wherein an average particle size of the nanoparticles is greater than an average inner diameter of the channel and is less than or equal to an inner diameter of an enlarged pore portion.

[6] The functional structural body according to [4], wherein the average particle size of the nanoparticles from 0.1 nm to 50 nm.

[7] The functional structural body according to [6], wherein the average particle size of the nanoparticles is from 0.45 nm to 14.0 nm.

[8] The functional structural body according to [4], wherein a ratio of the average particle size of the nanoparticles to the average inner diameter of the channel is from 0.06 to 500.

[9] The functional structural body according to [8], wherein the ratio of the average particle size of the nanoparticles to the average inner diameter of the channel is from 0.1 to 36.

[10] The functional structural body according to [9], wherein the ratio of the average particle size of the nanoparticles to the average inner diameter of the channel is from 1.7 to 4.5.

[11] The functional structural body according to [1], wherein the solid acid contains a metal element (M), the metal element (M) is contained in an amount of 0.5 mass % to 2.5 mass % based on the functional structural body.

[12] The functional structural body according to [1], wherein the channel has any one of a one-dimensional pore, a two-dimensional pore, and a three-dimensional pore defined by the framework of the zeolite-type compound and an enlarged pore portion which has a diameter different from any one of the one-dimensional pore, the two-dimensional pore, and the three-dimensional pore, the average inner diameter of the channel is from 0.1 nm to 1.5 nm, and the inner diameter of the enlarged pore portion is from 0.5 nm to 50 nm.

[13] The functional structural body according to [1], further including at least one functional substance held on an outer surface of the skeletal body.

[14] The functional structural body according to [13], wherein the content of the at least one solid acid present in the skeletal body is greater than that of the at least one functional substance held on the outer surface of the skeletal body.

[15] The functional structural body according to [1], wherein the zeolite-type compound is a silicate compound.

[16] A method for making a functional structural body, including:
a calcination step of calcinating a precursor material (B) obtained by impregnating a precursor material (A) for obtaining a skeletal body of a porous structure composed of a zeolite-type compound with a metal containing solution of a solid acid; and
a hydrothermal treatment step of hydrothermally treating a precursor material (C) obtained by calcinating the precursor material (B).

[17] The method for making a functional structural body according to [16], wherein 50 to 500 mass % of a non-ionic surfactant is added to the precursor material (A) before the calcination step.

[18] The method for making a functional structural body according to [16], wherein the precursor material (A) is impregnated with the metal containing solution by adding the metal containing solution in the precursor material (A) in multiple portions before the calcination step.

[19] The method for making a functional structural body according to [16], wherein in impregnating the precursor material (A) with the metal containing solution before the calcination step, the added amount of the metal containing solution added to the precursor material (A) is adjusted to 10 to 1000 in terms of the ratio of silicon (Si) constituting the precursor material (A) to the metal element (M) included in the metal containing solution added to the precursor material (A) (ratio of number of atoms Si/M).

[20] The method for making a functional structural body according to [16], wherein in the hydrothermal treatment step, the precursor material (C) and a structure directing agent are mixed.

[21] The method for making a functional structural body according to [16], wherein the hydrothermal treatment step is performed under a basic condition.

Advantageous Effects of Disclosure

According to the present disclosure, a functional structural body that can realize a prolonged life time by suppressing the decrease in function of the solid acid and that can fulfill resource saving without requiring a complicated replacement operation, and a method for making the functional structural body can be provided.

BRIEF DESCRIPTION OF DRAWINGS

FIG. 1A is a perspective view (partially shown in cross-section), and FIG. 1B is a partially enlarged cross-sectional view.

FIG. 2A is a diagram illustrating the function of a sieve, and FIG. 2B is a diagram explaining a catalytic function.

DETAILED DESCRIPTION OF THE DISCLOSURE

Hereinafter, embodiments of the present disclosure will be described in detail with reference to drawings.
[Configuration of Functional Structural Body]

Figure 1A:
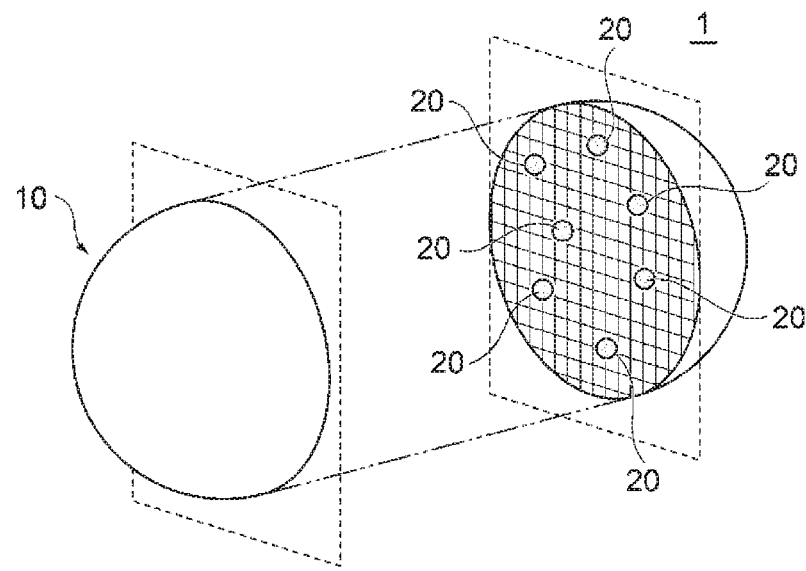
FIGS. 1A and 1B are diagrams schematically illustrating a functional structural body according to an embodiment of the present disclosure so that the inner structure can be understood.
Figure 1B:
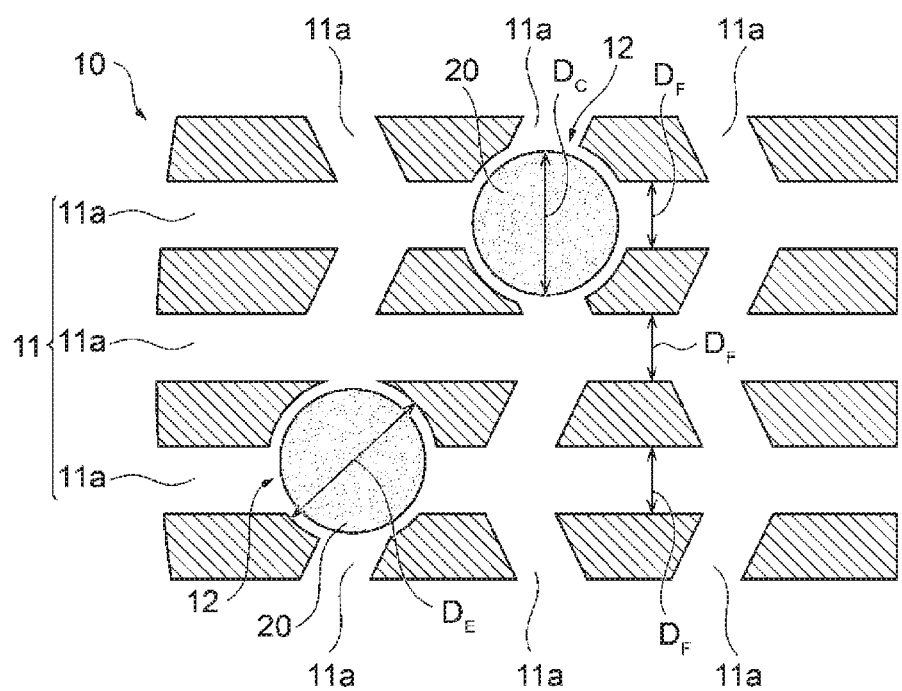

FIGS. 1A and 1B are diagrams schematically illustrating a configuration of a functional structural body according to an embodiment of the present disclosure. FIG. 1A is a perspective view (partially shown in cross-section), and FIG. 1B is a partially enlarged cross-sectional view. Note that the functional structural body in FIGS. 1A and 1B is an example of the functional structural body, and the shape, dimension, and the like of each of the configurations according to the present disclosure are not limited to those illustrated in FIGS. 1A and 1B.

As shown in FIG. 1A, a functional structural body 1 includes a skeletal body 10 of a porous structure composed of a zeolite-type compound, and at least one solid acid 20 present in the skeletal body 10.

The solid acid 20 is a substance that exhibits one or more functions alone, or in cooperation with the skeletal body 10. Specific examples of the functions described above include a catalytic function, a light emission (or fluorescent) function, a light-absorbing function, and an identification function. The solid acid 20 is, for example, a catalyst material having a catalytic function, and preferably nanoparticles. Note that when the solid acid 20 is the catalytic substance, the skeletal body 10 is a support that supports the catalytic substance. In the functional structural body 1, a plurality of solid acids 20, 20, . . . are embedded in the porous structure of the skeletal body 10.

The skeletal body 10 has a porous structure, and as illustrated in FIG. 1B, a plurality of pores 11a, 11a, . . . are suitably formed so as to have channels 11 connecting with each other. Here, the solid acid 20 is present at least in the channels 11 of the skeletal body 10, and is preferably held at least in the channels 11 of the skeletal body 10.

With such a configuration, movement of the solid acids 20 within the skeletal body 10 is restricted, and aggregation between the solid acids 20 and 20 is effectively prevented. As a result, the decrease in effective surface area as the solid acid 20 can be effectively suppressed, and the function of the solid acid 20 is continued for a long period of time. In other words, according to the functional structural body 1, the decrease in function due to aggregation of the solid acids 20 can be suppressed, and the life time of the functional structural body 1 can be prolonged. In addition, due to the prolonged life time of the functional structural body 1, the replacement frequency of the functional structural body 1 can be reduced, and the amount of waste of the used functional structural body 1 can be significantly reduced, and thereby can save resources.

Typically, when the functional structural body is used in a fluid (e.g., a heavy oil, or reformed gas such as $NO_x$, etc.), it can be subjected to an external force from the fluid. In this case, if the solid acid is only adhered to the outer surface of the skeletal body 10, there is a problem that it is easy to detach from the outer surface of the skeletal body 10 due to the effect of the external force from the fluid. In contrast, in the functional structural body 1, the solid acid 20 is present at least in the channel 11 of the skeletal body 10, and therefore, even if subjected to an external force caused by the fluid, the solid acid 20 is less likely to detach from the skeletal body 10. That is, when the functional structural body 1 is in the fluid, the fluid flows into the channel 11 from the pore Ha of the skeletal body 10, so that the speed of the fluid flowing through the channel 11 appears to be slower than the speed of the fluid flowing on the outer surface of the skeletal body 10 due to the flow path resistance (frictional force). Due to the effect of such flow path resistance, the pressure received by the solid acid 20 present in the channel 11 from the fluid is lower than the pressure received by the solid acid from the fluid outside of the skeletal body 10. As a result, detachment of the solid acid 20 present in the skeletal body 11 can be effectively suppressed, and the function of the solid acid 20 can be stably maintained over a long period of time. Note that the flow path resistance as described above is thought to be larger when the channel 11 of the skeletal body 10 has a plurality of bends and branches, and the interior of the skeletal body 10 becomes a more complex three-dimensional structure.

Preferably, the channel 11 has any one of a one-dimensional pore, a two-dimensional pore, and a three-dimensional pore defined by the framework of the zeolite-type compound and an enlarged pore portion which has a diameter different from any one of the one-dimensional pore, the two-dimensional pore, and the three-dimensional pore. In this case, the solid acid 20 is preferably present at least in the enlarged pore portion 12, and is preferably embedded at least in the enlarged pore portion 12. Here, the "one-dimensional pore" refers to a tunnel-shaped or cage-shaped pore forming a one-dimensional channel, or a plurality of tunnel-shaped or cage-shaped pores (a plurality of one-dimensional channels) forming a plurality of one-dimensional channels. Also, the "two-dimensional pore" refers to a two-dimensional channel in which a plurality of one-dimensional channels are connected two-dimensionally. The "three-dimensional pore" refers to a three-dimensional channel in which a plurality of one-dimensional channels are connected three-dimensionally.

As a result, the movement of the solid acid 20 within the skeletal body 10 is further restricted, and it is possible to further effectively prevent detachment of the solid acid 20 and aggregation between the solid acids 20, 20. Embedding refers to a state in which the solid acid 20 is capsuled inside the skeletal body 10. At this time, the solid acid 20 and the skeletal body 10 need not necessarily be in direct contact with each other, but the solid acid 20 may be indirectly held by the skeletal body 10 with other substances (e.g., a surfactant, etc.) interposed between the solid acid 20 and the skeletal body 10.

Although FIG. 1B illustrates the case in which the solid acid 20 is embedded in the enlarged pore portion 12, the solid acid 20 is not limited to this configuration only, and the solid acid 20 may be held in the channel 11 with a portion thereof protruding outward of the enlarged pore portion 12. Furthermore, the solid acid 20 may be partially embedded in a portion of the channel 11 other than the enlarged pore portion 12 (for example, an inner wall portion of the channel 11), or may be held by fixing, for example.

Additionally, the enlarged pore portion 12 preferably causes the plurality of pores 11a, 11a constituting any one of the one-dimensional pore, the two-dimensional pore, and the three-dimensional pore to connect with each other. As a result, a separate channel different from the one-dimensional pore, the two-dimensional pore, or the three-dimensional pore is provided in the interior of the skeletal body 10, so that the function of the functional substance 20 can be further exhibited.

Additionally, the channel 11 is formed three-dimensionally by including a branch portion or a merging portion in the interior of the skeletal body 10, and the enlarged pore portion 12 is preferably provided in the branch portion or the merging portion of the channel 11.

The average inner diameter $D_F$ of the channel 11 formed in the skeletal body 10 is calculated from the average value of the minor diameter and the major diameter of the pore 11a constituting any one of the one-dimensional pore, the two-dimensional pore, and the three-dimensional pore. For example, it is from 0.1 nm to 1.5 nm, and preferably from 0.5 nm to 0.8 nm. The inner diameter $D_E$ of the enlarged pore portion 12 is, for example, from 0.5 nm to 50 nm, preferably from 1.1 nm to 40 nm, and more preferably from 1.1 nm to 3.3 nm. For example, the inner diameter $D_E$ of the enlarged pore portion 12 depends on the pore diameter of the precursor material (A) described below and the average particle size $D_C$ of the solid acid 20 to be embedded. The inner diameter $D_E$ of the enlarged pore portion 12 is sized to be able to embed the solid acid 20.

The skeletal body 10 is composed of a zeolite-type compound. Examples of zeolite-type compounds include zeolite analog compounds such as zeolites (alminosilicates), cation exchanged zeolites, silicate compounds such as silicalite, alminoborates, aiminoarsenates, and germanates; and phosphate-based zeolite analog compounds such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MEI type, and more preferably ZSM-5. A plurality of pores having a pore diameter corresponding to each framework are formed in the zeolite-type compound. For example, the maximum pore diameter of MFI type is 0.636 nm (6.36 Å) and the average pore diameter is 0.560 nm (5.60 Å).

Hereinafter, the solid acid 20 will be described in detail.

When the solid acid 20 is nanoparticles, the nanoparticles may be present in the channel 11 in the state of primary particles and may be present in the channel 11 in the state of secondary particles formed by aggregation of primary particles. In both cases, the average particle size $D_C$ of the nanoparticles is preferably larger than the average inner diameter $D_F$ of the channel 11 and not greater than the inner diameter $D_E$ of the enlarged pore portion 12 ($D_F < D_C \leq D_E$). Such solid acid 20 are suitably embedded in the enlarged pore portion 12 within the channel 11, and the movement of the solid acid 20 within the skeletal body 10 is restricted. Thus, even if the solid acid 20 is subjected to external forces from the fluid, movement of the solid acid 20 within the skeletal body 10 is suppressed, and it is possible to effectively prevent the solid acids 20, 20, . . . embedded in the enlarged pore portions 12, 12, . . . dispersed in the channel 11 of the skeletal body 10 from coming into contact with each other.

When the solid acid 20 is nanoparticles, the average particle size $D_C$ of nanoparticles is preferably from 0.1 nm to 50 nm, more preferably 0.1 nm or greater and less than 30 nm, and further preferably from 0.45 nm to 14.0 nm, and particularly preferably from 1.0 nm to 3.3 nm, whichever nanoparticles are primary particles or second particles. Furthermore, the ratio ($D_C/D_F$) of the average particle size $D_C$ of the solid acid 20 to the average inner diameter $D_F$ of the channel 11 is preferably from 0.06 to 500, more preferably from 0.1 to 36, even more preferably from 1.1 to 36, and particularly preferably from 1.7 to 4.5.

Specific examples of the solid acid 20 include metal oxides and hydrates, sulfides, metal salts, complex oxides, and heteropolyacids. The metal oxides include iron oxide (FeOx), zinc oxide (ZnO), aluminum oxide ($Al_2O_3$), zirconium oxide ($ZrO_2$), titanium oxide ($TiO_2$), selenium trioxide ($SeO_3$), selenium dioxide ($SeO_2$), tellurium trioxide ($TeO_3$), tellurium dioxide ($TeO_2$), tin dioxide ($SnO_2$), manganese oxide ($Mn_2O_7$), technetium oxide ($Tc_2O_7$), and rhenium oxide ($Re_2O_7$). Also, sulfides include cadmium sulfide (CdS) and zinc sulfide (ZnS). Also, Metal salts include magnesium sulfate ($MgSO_4$), iron sulfate ($FeSO_4$), and aluminum chloride ($AlCl_3$). Also, complex oxides include $SiO_2$—$TiO_2$, $SiO_2$—MgO and $TiO_2$—$ZrO_2$. Furthermore, examples of heteropolyacids include phosphotungstic acid, silicotungstic acid, phosphomolybdic acid, and silicomnolybdic acid. Only one type of these solid acids 20 may be used, or a plurality of types may be used in combination. Among these metal oxides, the solid acid 20 is preferably at least one type selected from the group consisting of aluminum oxide ($Al_2O_3$), zirconium oxide ($ZrO_2$), and zinc oxide (ZnO). Note that the solid acid 20 is distinguished from a zeolite-type compound constituting the skeletal body 10. The solid acid 20 does not include, for example, zeolite.

The metal element (M) of the solid acid 20 is preferably contained in 0.5 to 2.5 mass % with respect to the functional structural body 1, and more preferably from 0.5 to 1.5 mass % relative to the functional structural body 1. For example, when the metal element (M) is Zr, the content of Zr element (mass %) is expressed as {(mass of Zr element)/(mass of all elements of the functional structural body 1)}×100.

Furthermore, the ratio of silicon (Si) constituting the skeletal body 10 to a metal element (M) constituting the solid acid 20 (the ratio of number of atoms Si/M) is preferably from 10 to 1000, and more preferably from 50 to 200. If the ratio is greater than 1000, the activity is low, and the action as the solid acid may not be sufficiently obtained. On the other hand, if the ratio is smaller than 10, the proportion of solid acid 20 becomes too large, and the strength of the skeletal body 10 tends to decrease. Note that the solid acids 20 described here, which are present in the interior of the skeletal body 10 or are supported, do not include solid acids adhered to the outer surface of the skeletal body 10.

[Function of Functional Structural Body]

The functional structural body 1 includes the skeletal body 10 of a porous structure and at least one solid acid 20 present in the skeletal body, as described above. The functional structural body 1 exhibits a function depending on the solid acid 20 by contacting the solid acid 20 present in the skeletal body 10 with a fluid. In particular, the fluid in contact with the outer surface 10a of the functional structural body 1 flows into the skeletal body 10 through the pore 11a formed in the outer surface 10a and guided into the channel 11, moves through the channel 11, and exits to the exterior of the functional structural body 1 through another pore 11a. In the pathway where fluid travels through the channel 11, contacting with the solid acid 20 present in the channel 11 results in a reaction (e.g., a catalytic reaction) depending on the function of the solid acid 20. In addition, the functional structural body 1 has molecule sieving capability due to a porous structure of the skeletal body.

Figure 2A:
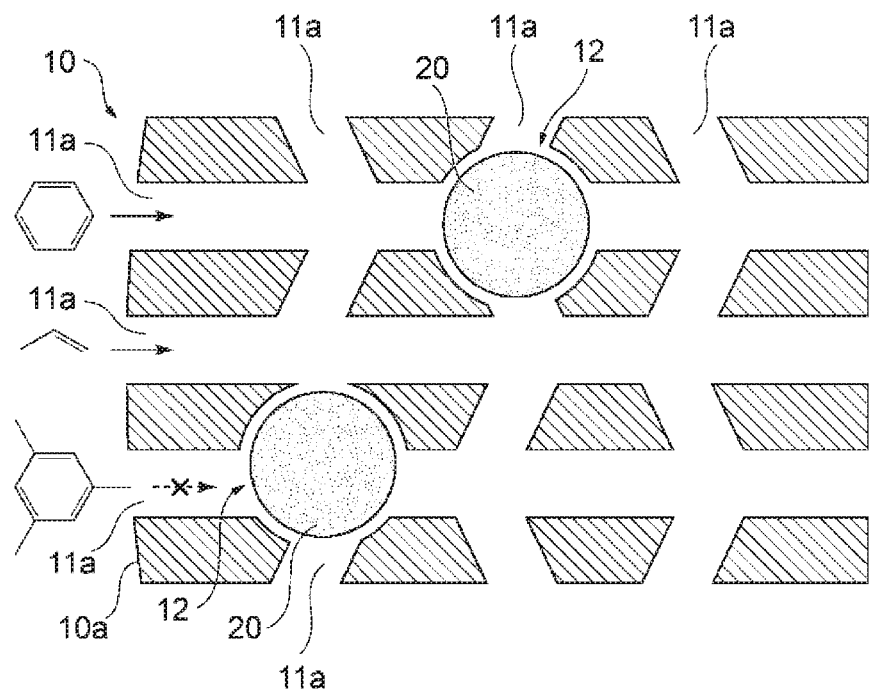
FIGS. 2A and 2B are a partial enlarged cross-sectional view for explaining an example of the function of the functional structural body of FIGS. 1A and 1B.

First, the case in which the fluid is a liquid containing benzene, propylene, and mesitylene is described as an example using FIG. 2A for the molecule sieving capability of the functional structural body 1. As illustrated in FIG. 2A, a compound (e.g., benzene, propylene) constituted by molecules having a size that is less than or equal to the pore diameter of the pore 11a, in other words, less than or equal to the inner diameter of the channel 11, can enter the skeletal body 10. On the other hand, a compound made up of molecules having a size exceeding the pore diameter of the pore 11a (for example, mesitylene) cannot enter the skeletal body 10. In this way, when the fluid contains a plurality of types of compounds, the reaction of compounds that cannot enter the skeletal body 10 can be restricted and a compound capable of entering the skeletal body 10 can undergo reaction.

Of the compounds produced in the skeletal body 10 by the reaction, only compounds composed of molecules having a size less than or equal to the pore diameter of the pore 11a can exit through the pore 11a to the exterior of the skeletal body 10, and are obtained as reaction products. On the other hand, a compound that cannot exit to the exterior of the skeletal body 10 from the pore 11a can be released out of the skeletal body 10 when converted into a compound made up of molecules sized to be able to exit to the exterior of the skeletal body 10. In this way, a specified reaction product can be selectively obtained by using the functional structural body 1.

Figure 2B:
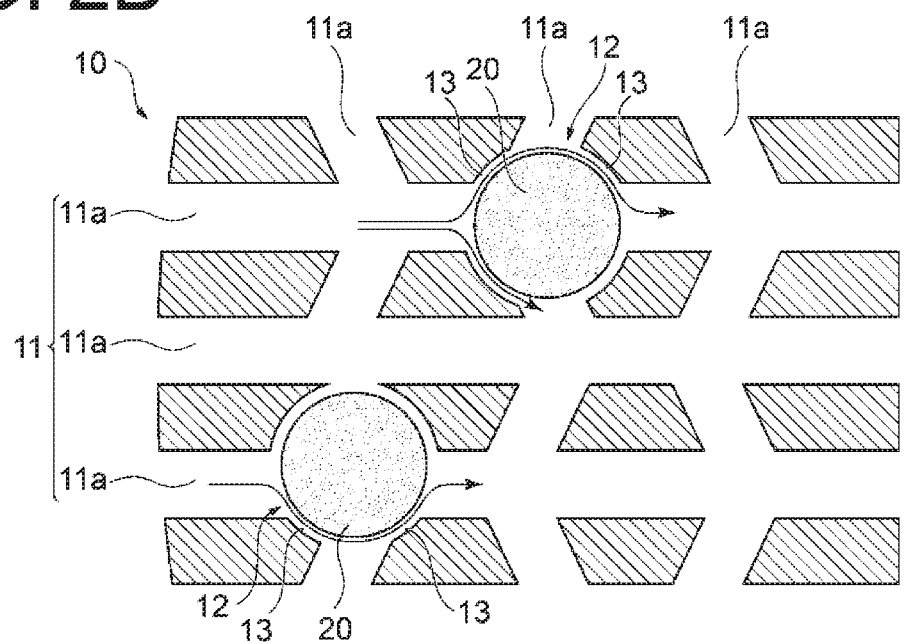

In the functional structural body 1, as illustrated in FIG. 2B, the solid acid 20 is suitably embedded in the enlarged pore portion 12 of the channel 11. When the solid acid 20 is nanoparticles, if the average particle size $D_C$ of the solid acid 20 is larger than the average inner diameter $D_F$ of the channel 11 and smaller than the inner diameter $D_E$ of the enlarged pore portion 12 ($D_F<D_C<D_E$), a small channel 13 is formed between the solid acid 20 and the enlarged pore portion 12. Thus, as indicated by the arrow in FIG. 2B, the fluid entering the small channel 13 comes into contact with the solid acid 20. Since each solid acid 20 is embedded in the enlarged pore portion 12, movement within the skeletal body 10 is restricted. As a result, aggregation between the solid acids 20 in the skeletal body 10 is prevented. As a result, a large contact area between the solid acids 20 and the fluid can be stably maintained.

Next, the case in which the solid acid 20 has a catalytic function will be described. Specifically, the case in which the solid acid 20 is zinc oxide ($ZnO_x$) nanoparticles and is permeated into the skeletal body 10 of the functional structural body 1 with dodecylbenzene which is a heavy oil will be described as an example. As dodecylbenzene enters the skeletal body 10, the dodecylbenzene is decomposed into various alcohols and ketones by an oxidative decomposition reaction, as described below. Furthermore, benzene, which is a light oil, is produced from a ketone (here, acetophenone), which is one of the degradation products. This means that the solid acid 20 functions as a catalyst in the oxidation decomposition reaction. In this way, the functional structural body 1 can be used to convert heavy oils to light oils. Conventionally, hydrocracking treatment using hydrogen has been performed to convert heavy oils to light oils. In contrast, by using the functional structural body 1, hydrogen is not required. Thus, heavy oils can be utilized to obtain light oils even in regions where hydrogen is difficult to supply. Furthermore, because hydrogen is not required, cost reduction can be realized, and it can be expected that the use of heavy oils that could not be sufficiently utilized can be promoted.

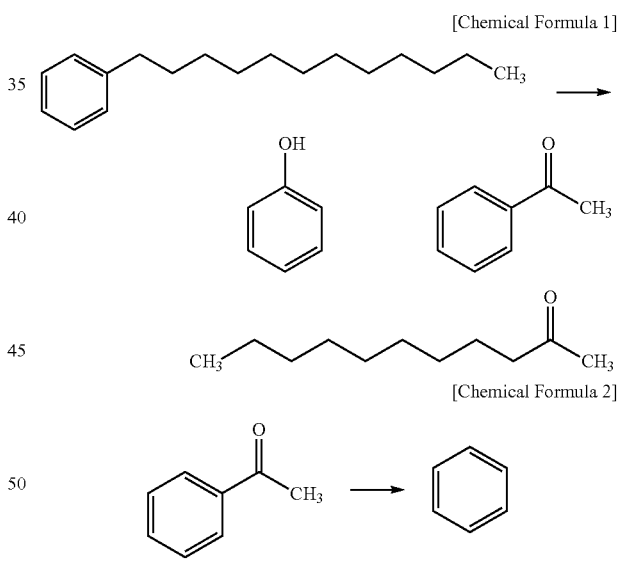

[Chemical Formula 1]

[Chemical Formula 2]

[Method for Making Functional Structural Body]

Figure 3:
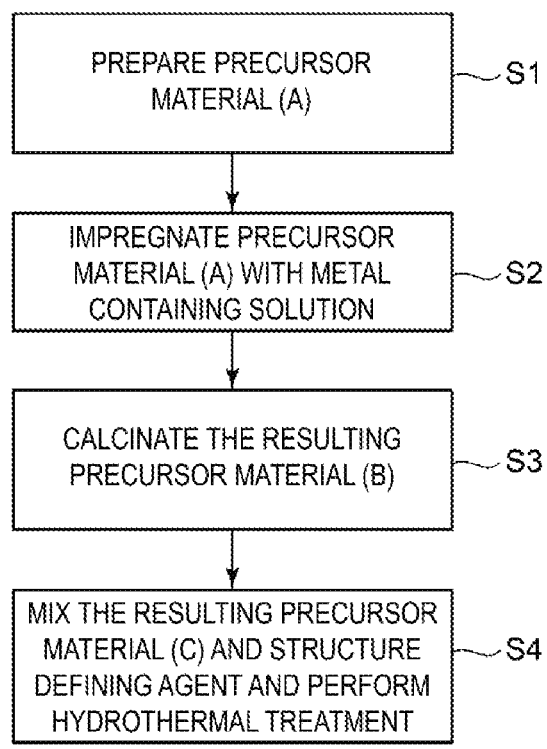
FIG. 3 is a flowchart illustrating an example of a method for making the functional structural body of FIGS. 1A and 1B.

FIG. 3 is a flowchart illustrating a method for making the functional structural body 1 of FIGS. 1A and 1B. An example of the method for making the functional structural body will be described below using, as an example, the case in which the solid acid present in the skeletal body is metal oxide nanoparticles.

(Step S1: Preparation Step)

As shown in FIG. 3, a precursor material (A) is first prepared for obtaining a skeletal body of a porous structure composed of a zeolite-type compound. The precursor material (A) is preferably an ordered mesopore material, and can be appropriately selected depending on the type (composition) of the zeolite-type compound constituting the skeletal body of the functional structural body.

Here, when the zeolite-type compound constituting the skeletal body of the functional structural body is a silicate compound, the ordered mesopore material is preferably a compound including a Si—O skeleton in which pores having a pore diameter of 1 nm to 50 nm are uniformly sized and regularly developed in one dimension, two dimensions, or three dimensions. While such an ordered mesopore material is obtained as a variety of synthetic materials depending on the synthetic conditions. Specific examples of the synthetic material include SBA-1, SBA-15, SBA-16, KIT-6, FSM-16, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm, Examples of such an ordered mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing an ordered mesopore material. For example, a mixed solution including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is collected (e.g., filtered), washed and dried as necessary, and then calcinated to obtain a precursor material (A) which is a powdered ordered mesopore material. Here, examples of the solvent of the mixed solution that can be used include water, an organic solvent such as alcohol, or a mixed solvent thereof. In addition, the raw material is selected depending on the type of the skeletal body, but examples thereof include silica agents such as tetraethoxysilane (TEOS), fumed silica, and quartz sand. In addition, various types of surfactants, block copolymers, and the like can be used as the molding agent, and it is preferably selected depending on the type of the synthetic materials of the ordered mesopore material. For example, a surfactant such as hexadecyltrimethylammonium bromide is suitable for producing MCM-41. The hydrothermal treatment can be performed at 0 to 2000 kPa at 80 to 800° C. for 5 hours to 240 hours in a sealed container. The calcination treatment can be performed, for example in air, at 350 to 850° C. for 2 hours to 30 hours.

(Step S2: Impregnating Step)

The prepared precursor material (A) is then impregnated with the metal containing solution to obtain the precursor material (B).

The metal containing solution is a solution containing one (for example, a metal ion) corresponding to a metal element (M) constituting the metal oxide nanoparticles, and can be prepared, for example, by dissolving a metal salt containing the metal element (M) in a solvent. Examples of such metal salts include chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal containing solution is not particularly limited; however, for example, the metal containing solution is preferably added in portions several times while mixing the powdered precursor material (A) before the calcination step described below. In addition, the surfactant is preferably added to the precursor material (A) as an additive to the precursor material (A) before adding the metal containing solution, from the perspective of allowing the metal containing solution to enter the pores of the precursor material (A) more easily. It is believed that such additives serve to cover the outer surface of the precursor material (A) and inhibit the subsequently added metal containing solution from adhering to the outer surface of the precursor material (A), making it easier fir the metal containing solution to enter the pores of the precursor material (A).

Examples of such additives include non-ionic surfactants such as polyoxyethylene alkyl ether including polyoxyethylene oleyl ether, and polyoxyethylene alkylphenyl ether. It is believed that these surfactants do not adhere to the interior of the pores because their molecular size is large and cannot enter the pores of the precursor material (A), and do not interfere with the penetration of the metal containing solution into the pores. As the method for adding the non-ionic surfactant, for example, it is preferable to add from 50 to 500 mass % of the non-ionic surfactant relative to the precursor material (A) prior to the calcination step described below. If the added amount of the non-ionic surfactant is less than 50 mass % relative to the precursor material (A), the aforementioned suppressing effect is does not easily exhibited, and when more than 500 mass % of the non-ionic surfactant is added to the precursor material (A), the viscosity is too high, which is not preferable. Thus, the added amount of the non-ionic surfactant relative to the precursor material (A) is a value within the range described above.

Furthermore, the added amount of the metal containing solution added to the precursor material (A) is preferably adjusted as appropriate in consideration of the amount of the metal element (M) contained in the metal containing solution with which the precursor material (A) is impregnated (that is, the amount of the metal element (M) present in the precursor material (B)). For example, prior to the calcination step described below, the added amount of the metal containing solution added to the precursor material (A), in terms of a ratio of silicon (Si) constituting the precursor material (A) to a metal element (M) included in the metal containing solution added to the precursor material (A) (the ratio of number of atoms Si/M), is preferably adjusted to 10 to 1000, and more preferably 50 to 200. For example, if the surfactant is added to the precursor material (A) as the additive prior to adding the metal containing solution to the precursor material (A), when the added amount of the metal containing solution added to the precursor material (A), in terms of the ratio of number of atoms Si/M, is from 50 to 200, 0.5 to 2.5 mass % of the metal element (M) of the metal oxide nanoparticles can be included in the functional structural body. In the state of the precursor material (B), the amount of the metal element (M) present within the pores is generally proportional to the added amount of the metal containing solution added to the precursor material (A) if the metal concentration of the metal containing solution, the presence or absence of additives, and other conditions such as temperature, pressure, and the like are the same. The amount of metal element (M) present in the precursor material (B) is also in a proportional relationship to the amount of metal element constituting the metal oxide nanoparticles present in the skeletal body of the functional structural body. Thus, by controlling the added amount of the metal containing solution added to the precursor material (A) to the range described above, the pores of the precursor material (A) can be sufficiently impregnated with the metal containing solution, and thus the amount of metal oxide nanoparticles present in the skeletal body of the functional structural body can be adjusted.

After impregnating the precursor material (A) with the metal containing solution, a washing treatment may be performed as necessary. Examples of the washing solution that can be used include water, an organic solvent such as alcohol, or a mixed solvent thereof. Furthermore, the precursor material (A) is preferably impregnated with the metal containing solution, and after the washing treatment is performed as necessary, the precursor material (A) is further subjected to drying treatment. Drying treatments include overnight natural drying and high temperature drying at 150° C. or lower. Note that when calcination treatment described below is performed in the state in which a large amount of moisture contained in the metal containing solution and the wash solution remains in the precursor material (A), the skeletal structure as the ordered mesopore material of the precursor material (A) may be broken, and thus it is preferable to dry them sufficiently.

(Step S3: Calcination Step)

Next, a precursor material (C) is obtained by calcinating the precursor material (B) obtained by impregnating the precursor material (A) for obtaining the skeletal body of the porous structure composed of a zeolite-type compound with the metal containing solution.

The calcination treatment can be preferably performed, for example in air, at 350 to 850° C. for 2 hours to 30 hours. The metal component that has entered the pores of the ordered mesopore material undergoes crystal growth by such a calcination treatment, and metal oxide nanoparticles are formed in the pores.

(Step S4: Hydrothermal Treatment Step)

A mixed solution of the precursor material (C) and a structure directing agent is then prepared, and the precursor material (C) obtained by calcinating the precursor material (B) is hydrothermally treated to obtain a functional structural body.

The structure directing agent is a molding agent for defining the framework of the skeletal body of the functional structural body, and for example, the surfactant can be used. The structure directing agent is preferably selected depending on the framework of the skeletal body of the functional structural body, and for example, a surfactant such as tetramethylammonium bromide (TMABr), tetraethylammonium bromide (TEABr), and tetrapropylammonium bromide (TPABr) are suitable.

The mixing of the precursor material (C) and the structure directing agent may be performed during the hydrothermal treatment step or may be performed before the hydrothermal treatment step. Furthermore, the method for preparing the mixed solution is not particularly limited, and the precursor material (C), the structure directing agent, and the solvent may be mixed simultaneously, or after the precursor material (C) and the structure directing agent are each dispersed in the solvent, and the dispersion solutions may be mixed. Examples of the solvent that can be used include water, an organic solvent such as alcohol, or a mixed solvent thereof. In addition, it is preferable that the pH of the mixed solution is adjusted using an acid or a base prior to performing the hydrothermal treatment.

The hydrothermal treatment can be performed by a known method. For example, the hydrothermal treatment can be preferably performed at 0 to 2000 kPa at 80 to 800° C. for 5 hours to 240 hours in a sealed container. Furthermore, the hydrothermal treatment is preferably performed under a basic condition.

Although the reaction mechanism here is not necessarily clear, by performing hydrothermal treatment using the precursor material (C) as a raw material, the skeletal structure as the ordered mesopore material of the precursor material (C) becomes gradually disrupted. However, under the action of the structure directing agent, a new framework (porous structure) is formed as the skeletal body of the functional structural body while substantially maintaining the position of the metal oxide nanoparticles within the pores of the precursor material (C). The functional structural body obtained in this way includes the skeletal body having the porous structure and metal oxide nanoparticles present in the skeletal body, and the skeletal body has a channel in which a plurality of pores connect with each other by the porous structure, and at least a portion of the metal oxide nanoparticles are held in the channel of the skeletal body.

Furthermore, in the present embodiment, in the hydrothermal treatment step, a mixed solution in which the precursor material (C) and the structure directing agent are mixed is prepared, and the precursor material (C) is subjected to hydrothermal treatment, which is not a limitation. The precursor material (C) may be subjected to hydrothermal treatment without mixing the precursor material (C) and the structure directing agent.

The precipitate obtained after hydrothermal treatment (functional structural body) is preferably washed, dried, and calcinated as necessary after collected (e.g., filtered). Examples of the washing solution that can be used include water, an organic solvent such as alcohol, or a mixed solution thereof. Examples of the drying treatments include overnight natural drying and high temperature drying at 150° C. or lower. Note that when calcination treatment is performed in the state in which there is a large amount of moisture remaining in the precipitate, the framework as a skeletal body of the functional structural body may be broken, and thus it is preferable to dry the precipitate sufficiently. Also, the calcination treatment can be performed, for example in air, at 350 to 850° C. for 2 hours to 30 hours. Such calcination treatment burns out the structure directing agent that has been attached to the functional structural body. Furthermore, the functional structural body can be used as is without subjecting the collected precipitate to calcination treatment, depending on the intended use. For example, if the environment in which the functional structural body is used is a high temperature environment of an oxidizing atmosphere, exposing the functional structural body to a usage environment for a period of time allows the structure directing agent to be burned out. In this case, a functional structural body similar to the case where the calcination treatment is performed is obtained, and thus it is not necessary to perform the calcination treatment.

[Modified Example of Functional Structural Body 1]

Figure 4:
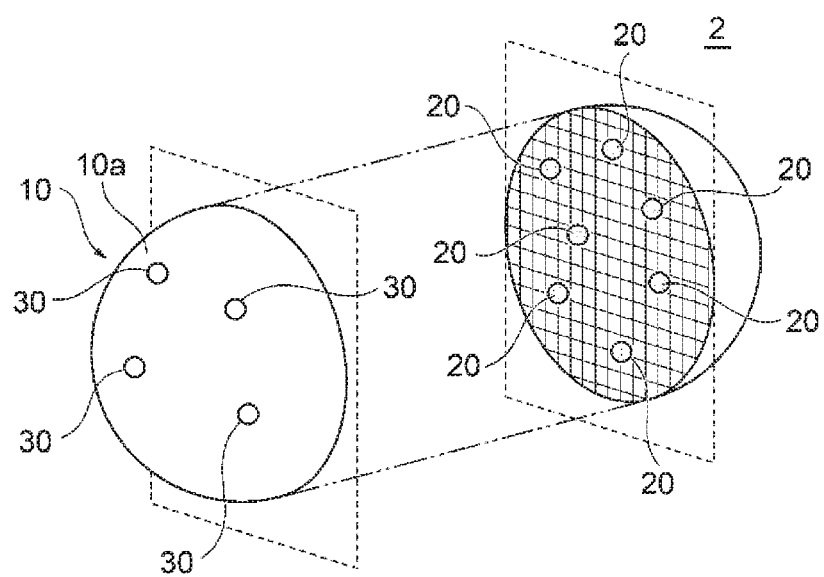
FIG. 4 is a schematic view illustrating a modified example of the functional structural body of FIGS. 1A and 1B.

FIG. 4 is a schematic view illustrating a modified example of the functional structural body 1 in FIGS. 1A and 1B.

Although the functional structural body 1 of FIGS. 1A and 1B illustrates the case in which it includes the skeletal body 10 and the solid acid 20 present in the skeletal body 10, the functional structural body is not limited to this configuration. For example, as illustrated in FIG. 4, the functional structural body 2 may further include at least one functional substance 30 held on the outer surface 10a of the skeletal body 10.

This functional substance 30 is a substance that exhibits one or more functions. The functions of the functional substance 30 may be the same as or different from the function of the solid acid 20. A specific example of the function of the functional substance 30 is the same as that described for the solid acid 20. The functional substance 30 preferably has a catalytic function, and the functional substance 30 is a catalytic substance. The functional substance 30 may be a solid acid and the functional substance 30 may be the same substance as the solid acid 20 or may be a different substance when the functional substance 30 is a solid acid. In particular, when the functional substance 30 is a solid acid, the content of solid acid retained in a functional structural body 2 can be increased compared to functional structural body 1, which may further promote catalytic reaction with solid acids.

In this case, the content of the solid acid 20 present in the skeletal body 10 is preferably greater than that of the functional substance 30 held on the outer surface 10a of the skeletal body 10. As a result, the function of the solid acid 20 retained inside the skeletal body 10 becomes dominant, and functions of the solid acids are stably exhibited.

Hereinbefore, the functional structural body according to the embodiments of the present disclosure has been described, but the present disclosure is not limited to the above embodiments, and various modifications and changes are possible on the basis of the technical concept of the present disclosure.

EXAMPLES

Examples 1 to 288

[Synthesis of Precursor Material (A)]

A mixed aqueous solution was prepared by mixing a silica agent (tetraethoxysilane (TEOS), available from Wako Pure Chemical Industries, Ltd.) and a surfactant as a molding agent. The pH was adjusted as appropriate, and hydrothermal treatment was performed at 80 to 350° C. for 100 hours in a sealed container. Thereafter, the produced precipitate was filtered out, washed with water and ethanol, and then calcinated in air at 600° C. for 24 hours to obtain the precursor material (A) of the type and having the pore diameter shown in Tables 1 to 6. Note that the following surfactant was used depending on the type of the precursor material (A) ("type of precursor material (A): surfactant").

MCM-41: Hexadecyltrimethylammonium bromide (CTAB) (available from Wako Pure Chemical Industries, Ltd.)

SBA-1: Pluronic P123 (available from BASF)

[Fabrication of Precursor Material (B) and (C)]

Next, a metal containing aqueous solution was prepared by dissolving a metal salt containing a metal element (M) in water depending on the metal element (M) constituting the solid acid fine particles nanoparticles of the type shown in Tables 1 to 6. Note that the following metal salt was used in accordance with the type of solid acid nanoparticles ("type of solid acid nanoparticles: metal salt").

$ZnO_x$: Zinc nitrate hexahydrate (available from Wako Pure Chemical Industries, Ltd.)

$AlO_x$: Aluminum nitrate nonahydrate (available Wako Pure Chemical Industries, Ltd.)

$ZrO_x$: Zirconium nitrate dihydrate (available from Wako Pure Chemical Industries, Ltd.)

Next, a metal containing solution was added to the powdered precursor material (A) in portions, and dried at room temperature (20° C.±10° C.) for 12 hours or longer to obtain the precursor material (B).

Note that when the presence or absence of additives shown in Tables 1 to 6 is "yes", pretreatment in which an aqueous solution of polyoxyethylene (15) oleyl ether (NIKKOL BO-15 V, available from Nikko Chemicals Co., Ltd.) is added as the additive to the precursor material (A) prior to adding the metal containing aqueous solution, and then the metal containing aqueous solution was added as described above. Note that when the presence or absence of an additive is "no", pretreatment with an additive such as that described above has not been performed.

Furthermore, the added amount of the metal containing aqueous solution added to the precursor material (A) was adjusted such that the value obtained by converting it to a ratio of silicon (Si) constituting the precursor material (A) to a metal element (M) included in the metal containing aqueous solution (ration of number of atoms Si/M) is in Tables 1 to 6.

Next, the precursor material (B) impregnated with the metal containing aqueous solution obtained as described above was calcinated in air at 600° C. for 24 hours to obtain the precursor material (C).

[Synthesis of Functional Structural Body]

The precursor material (C) obtained as described above and the structure directing agent shown in Tables 1 to 6 were mixed to produce a mixed aqueous solution. Hydrothermal treatment was performed under the conditions of at 80 to 350° C., at pH and time shown in Tables 1 to 6 in a sealed container. Thereafter, the produced precipitate was filtered out, washed with water, dried at 100° C. for 12 hours or longer, and further calcinated in air at 600° C. for 24 hours to obtain a functional structural body having the skeletal body and solid acid nanoparticles as the functional substance, as shown in Tables 1 to 6 (Examples 1 to 288).

Comparative Example 1

In Comparative Example 1, cobalt oxide powder (II, III) having an average particle size of 50 nm or less (available from Sigma-Aldrich Japan LLC) was mixed with MFI type silicalite, and a functional structural body in which cobalt oxide nanoparticles were attached as the functional substance to the outer surface of the silicalite as the skeletal body. MFI type silicalite was synthesized in the same manner as in Examples 52 to 57 except for a step of adding a metal.

Comparative Example 2

In Comparative Example 2, MFI type silicalite was synthesized in the same manner as in Comparative Example 1 except that the step of attaching the cobalt oxide nanoparticles was omitted.

[Evaluation]

Various characteristic evaluations were performed on the Examples 1 to 288 and the silicalites of Comparative Examples 1 and 2 under the conditions described below.

[A] Cross Sectional Observation

An observation sample was produced using a pulverization method for each of the functional structural bodies of Examples 1 to 288 and the silicalites Comparative Example 1 and 2, and the cross section observation was performed using a transmission electron microscope (TEM) (TITAN G2, available from FEI).

As a result, it was confirmed that, in the functional structural body of each of Examples described above, the solid acid nanoparticles are present and retained inside the skeletal body made from silicalite or zeolite. On the other hand, in the silicalite of Comparative Example 1, the solid acid nanoparticles were only attached to the outer surface of the skeletal body and were not present inside the skeletal body.

In addition, of Examples described above, for the functional structural body in which the solid acid nanoparticles are ZrOx, a cross section was cut out by focused ion beam (FIB) processing, and the section element analysis was performed using SEM (SU8020, available from Hitachi High-Technologies Corporation), and EDX (X-Max, available from Horiba, Ltd.). As a result, elements Zr were detected from inside the skeletal body.

It was confirmed that ZrOx nanoparticles were present in the skeletal body from the results of the cross-sectional observation using the above-described TEM and SEM/EDX.

[B] Average Inner Diameter of the Channel of the Skeletal Body and Average Particle Size of the Solid Acid Nanoparticles In the TEM image taken by the cross-sectional observation performed in evaluation [A] above, 500 channels of the skeletal body were randomly selected, and the respective major diameter and the minor diameter were measured, and the respective inner diameters were calculated from the average values (N=500), and the average value of the inner diameter was designated as the average inner diameter $D_F$ of the channel of the skeletal body. In addition, for the solid acid nanoparticles, 500 solid acid nanoparticles were randomly selected from the TEM image, and the respective particle sizes were measured (N=500), and the average value thereof was designated as the average particle size $D_C$ of the solid acid nanoparticle. The results are shown in Tables 1 to 6.

Also, SAXS (small angle X-ray scattering) was used to analyze the average particle size and dispersion status of the functional substance. Measurements by SAXS were performed using a Spring—8 beam line BL19B2. The obtained SAXS data was fitted with a spherical model using the Guinier approximation method, and the particle size was calculated. Particle size was measured for the functional structural body in which the solid acid is iron oxide nanoparticles. Furthermore, as a comparative reference, a commercially available iron oxide nanoparticles (available from Wako) was observed and measured on SEM.

As a result, in commercial products, various sizes of iron oxide nanoparticles were randomly present in a range of particle sizes of approximately 50 nm to 400 nm, whereas in the measurement results of SAXS, scattering peaks with particle sizes of 10 nm or less were also detected in the functional structural bodies of each Example having an average particle size of 1.2 nm to 2.0 nm determined from the TEM image. From the results of SAXS measurement and the SEM/EDX cross-sectional measurement, it was found that functional substances having a particle size of 10 nm or less are present in the skeletal body in a highly dispersed state with a uniform particle size.

[C] Relationship Between the Added Amount of the Metal Containing Solution and the Amount of Metal Embedded in the Skeletal Body A functional structural body in which solid acids were embedded in the skeletal body at an added amount of the ratio of number of atoms of Si/M=50, 100, 200, 1000 (M=Al, Zr, Zn) was produced, and then the amount of metal (mass %) that was embedded in the skeletal body of the functional structural body produced at the above added amount was measured. Note that in the present measurement, a functional structural body with the ratio of number of atoms of Si/M=100, 200, 1000 is produced by adjusting the added amount of the metal containing solution in the same manner as the functional structural body with the ratio of number of atoms Si/M=100, 200, 1000 in Examples 1 to 288, and functional structural body with the ratio of number of atoms of Si/M=50 were made in the same manner as the functional structural body with the ratio of number of atoms of Si/M=100, 200, 1000, except that the added amount of the metal containing solution was different.

The amount of metal was quantified by ICP (radiofrequency inductively coupled plasma) alone or in combination with ICP and XRF (fluorescence X-ray analysis). XRF (energy dispersive fluorescent X-ray analyzer "SEA1200VX", available from SSI Nanotechnology) was performed under conditions of a vacuum atmosphere, an accelerating voltage of 15 kV (using a Cr filter), or an accelerating voltage of 50 kV (using a Pb filter).

XRF is a method for calculating the amount of metal present in terms of fluorescence intensity, and XRF alone cannot calculate a quantitative value (in terms of mass %). Therefore, the metal content of the functional structural body to which the metal was added at Si/M=100 was determined by ICP analysis, and the metal content of the functional structural body in which the metal was added at Si/M=50 and less than 100 was calculated based on XRF measurement results and ICP measurement results.

As a result, it was confirmed that the amount of metal embedded in the functional structural body increases as the added amount of the metal containing solution increases, and was at least within a range that the ratio of number of atoms Si/M is within 50 to 1000.

[D] Performance Evaluation

The catalytic capacity (performance) of the solid acid nanoparticles (catalytic substances) was evaluated for the functional structural body of Examples and Comparative Examples. The results are shown in Tables 1 to 6.

(1) Catalytic Activity

The catalytic activity was evaluated under the following conditions:

First, 0.2 g of the functional structural body was charged in a normal pressure flow reactor, and a decomposition reaction of butylbenzene (model material for heavy oil) was performed with nitrogen gas ($N_2$) as a carrier gas (5 ml/min) at 400° C. for 2 hours.

After completion of the reaction, the generated gas and the generated liquid that were collected were analyzed by gas chromatography (GC) and gas chromatography mass spectrometry (GC/MS) for the composition. Note that, as the analysis device, TRACE 1310 GC (available from Thermo Fisher Scientific Inc., detector: thermal conductivity detector, flame ionization detector), and TRACE DSQ (Thermo Fischer Scientific Inc., detector: mass detector, ionization method: EI (ion source temperature of 250° C., MS transfer line temperature of 320° C.)) were used.

Furthermore, based on the results of the analysis described above, the yield (mol %) of a compound having a molecular weight lower than that of butylbenzene (specifically, benzene, toluene, ethylbenzene, styrene, cumene, methane, ethane, ethylene, propane, propylene, butane, butene, and the like) was determined. The yield of the compound was calculated as the percentage (mol %) of the total amount (mol) of the amount of substance of the compound having a lower molecular weight than that of the butylbenzene contained in the generated liquid (mol %) relative to the amount of substance of butylbenzene (mol) prior to the reaction.

In the present Examples, when the yield of a compound having a molecular weight lower than that of butylbenzene contained in the generated liquid is 40 mol % or more, it is determined that the catalytic activity (capacity of decomposition) is excellent, and considered as "A". When it is 25 mol % or more and less than 40 mol %, it is determined that the catalytic activity is good, and considered as "B". When it is 10 mol % or more and less than 25 mol %, it is determined that the catalytic activity is not good, but is pass level (acceptable), and considered as "C". When it is less than 10 mol %, it is determined that the catalytic activity is poor (unacceptable), and considered as "D".

(2) Durability (Life Time)

The durability was evaluated under the following conditions:

First, the functional structural body used in evaluation (1) was collected and heated at 650° C. for 12 hours to produce a functional structural body after heating. Next, a decomposition reaction of butylbenzene (model material of heavy oil) was performed by the same method as in evaluation (1) above using the obtained functional structural body after heating, and composition analysis of the generated gas and the generated liquid was performed in the same manner as in the (1).

Based on the obtained analytical results, the yield (mol %) of a compound having a molecular weight lower than that of butylbenzene was determined in the same manner as in evaluation (1). Furthermore, the degree of maintaining the yield of the above compound by the functional structural body after heating was evaluated with respect to the yield of the above compound by the functional structural body prior to heating (yield determined in evaluation (1) above). Specifically, the percentage (%) of the yield of the compound by the functional structural body after heating (yield determined in evaluation (2)) to the yield of the above compound by the functional structural body prior to heating (yield determined in evaluation (1)) was calculated.

In the present Examples, when the yield of the compound of the above compound by the functional structural body after heating (yield determined in evaluation (2)) is maintained at least 80% compared to the yield of the compound by the functional structural body prior to heating (yield determined in evaluation (1)), it is determined that the durability (heat resistance) is excellent, and considered as "A". When it is maintained 60% or more and less than 80%, it is determined that the durability (heat resistance) is good, and considered as "B". When it is maintained 40% or more and less than 60%, it is determined that the durability (heat resistance) is not good, but is pass level (acceptable), and considered as "C". When it is reduced below 40%, it is determined that the durability (heat resistance) is poor (unacceptable), and considered as "D".

Note that performance evaluations similar to those of evaluation (1) and (2) were also performed on Reference Example 1, Reference Example 1 is the skeletal body itself and does not have solid acid nanoparticles. Therefore, in the performance evaluation described above, only the skeletal body of Reference Example 1 was charged in place of the functional structural body. The results are shown in Table 6.

TABLE 1

Making Conditions for Functional Structural Body

| No. | Precursor Material (A) Type | Precursor Material (A) Pore Diameter (nm) | Addition to Precursor Material (A) Presence or Absence of Additives | Conversion Ratio of Added Amount of Metal Containing Solution | Type of Structure Directing agent | Hydrothermal Treatment Conditions for Precursor Material (C) pH | Hydrothermal Treatment Conditions for Precursor Material (C) Time (h) |
|---|---|---|---|---|---|---|---|
| Example 1 | MCM-41 | 1.3 | Yes | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | None | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |
| Example 19 | | 2.6 | | | | | |
| Example 20 | | 3.3 | | | | | |
| Example 21 | | 6.6 | | | | | |
| Example 22 | SBA-1 | 13.2 | | | | | |
| Example 23 | | 19.8 | | | | | |
| Example 24 | | 26.4 | | | | | |
| Example 25 | MCM-41 | 1.1 | Yes | 1000 | | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |
| Example 33 | | 5.4 | | | | | |

TABLE 1-continued

| No. | (col2) | (col3) | (col4) | (col5) |
|---|---|---|---|---|
| Example 34 | SBA-1 | 10.9 | | |
| Example 35 | | 16.3 | | |
| Example 36 | | 21.8 | | |
| Example 37 | MCM-41 | 1.1 | None | 1000 |
| Example 38 | | | | 500 |
| Example 39 | | | | 200 |
| Example 40 | | | | 100 |
| Example 41 | | 1.6 | | |
| Example 42 | | 2.0 | | |
| Example 43 | | 2.2 | | |
| Example 44 | | 2.7 | | |
| Example 45 | | 5.4 | | |
| Example 46 | SBA-1 | 10.9 | | |
| Example 47 | | 16.3 | | |
| Example 48 | | 21.8 | | |

| No. | Skeletal body Zeolite-Type Compound Framework | Average Inner Diameter $D_F$ of Channels (nm) | Functional Substance Solid acid nanoparticles Type | Average particle size $D_C$ (nm) | $D_C/D_F$ | Performance Evaluation Catalytic Activity | Durability |
|---|---|---|---|---|---|---|---|
| Example 1 | FAU | 0.74 | $ZnO_x$ | 0.13 | 0.2 | C | C |
| Example 2 | | | | 0.40 | 0.5 | C | C |
| Example 3 | | | | 0.66 | 0.9 | B | C |
| Example 4 | | | | 1.32 | 1.8 | A | B |
| Example 5 | | | | 1.98 | 2.7 | A | B |
| Example 6 | | | | 2.38 | 3.2 | A | A |
| Example 7 | | | | 2.64 | 3.6 | A | A |
| Example 8 | | | | 3.30 | 4.5 | A | A |
| Example 9 | | | | 6.61 | 8.9 | B | A |
| Example 10 | | | | 13.21 | 17.9 | B | A |
| Example 11 | | | | 19.82 | 26.8 | C | A |
| Example 12 | | | | 26.43 | 35.7 | C | A |
| Example 13 | | | | 0.13 | 0.2 | C | C |
| Example 14 | | | | 0.40 | 0.5 | C | C |
| Example 15 | | | | 0.66 | 0.9 | B | C |
| Example 16 | | | | 1.32 | 1.8 | A | B |
| Example 17 | | | | 1.98 | 2.7 | A | B |
| Example 18 | | | | 2.38 | 3.2 | B | A |
| Example 19 | | | | 2.64 | 3.6 | B | A |
| Example 20 | | | | 3.30 | 4.5 | B | A |
| Example 21 | | | | 6.61 | 8.9 | C | A |
| Example 22 | | | | 13.21 | 17.9 | C | A |
| Example 23 | | | | 19.82 | 26.8 | C | A |
| Example 24 | | | | 26.43 | 35.7 | C | A |
| Example 25 | MTW | 0.61 | | 0.11 | 0.2 | C | C |
| Example 26 | | | | 0.33 | 0.5 | C | C |
| Example 27 | | | | 0.54 | 0.9 | B | C |
| Example 28 | | | | 1.09 | 1.8 | A | B |
| Example 29 | | | | 1.63 | 2.7 | A | B |
| Example 30 | | | | 1.96 | 3.2 | A | B |
| Example 31 | | | | 2.18 | 3.6 | A | A |
| Example 32 | | | | 2.72 | 4.5 | A | A |
| Example 33 | | | | 5.45 | 8.9 | B | A |
| Example 34 | | | | 10.89 | 17.9 | B | A |
| Example 35 | | | | 16.34 | 26.8 | C | A |
| Example 36 | | | | 21.79 | 35.7 | C | A |
| Example 37 | | | | 0.11 | 0.2 | C | C |
| Example 38 | | | | 0.33 | 0.5 | C | C |
| Example 39 | | | | 0.54 | 0.9 | B | C |
| Example 40 | | | | 1.09 | 1.8 | A | B |
| Example 41 | | | | 1.63 | 2.7 | A | B |
| Example 42 | | | | 1.96 | 3.2 | A | B |
| Example 43 | | | | 2.18 | 3.6 | B | A |
| Example 44 | | | | 2.72 | 4.5 | B | A |
| Example 45 | | | | 5.45 | 8.9 | C | A |
| Example 46 | | | | 10.89 | 17.9 | C | A |
| Example 47 | | | | 16.34 | 26.8 | C | A |
| Example 48 | | | | 21.79 | 35.7 | C | A |

TABLE 2

| | Making Conditions for Functional Structural Body | | | | | | |
|---|---|---|---|---|---|---|---|
| | Precursor Material (A) | | Addition to Precursor Material (A) | | Hydrothermal Treatment Conditions for Precursor Material (C) | | |
| No. | Type | Pore Diameter (nm) | Presence or Absence of Additives | Conversion Ratio of Added Amount of Metal Containing Solution | Type of Structure Directing agent | pH | Time (h) |
| Example 49 | MCM-41 | 1.0 | Yes | 1000 | TPABr | 12 | 72 |
| Example 50 | | | | 500 | | | |
| Example 51 | | | | 200 | | | |
| Example 52 | | | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | None | 1000 | | | |
| Example 62 | | | | 500 | | | |
| Example 63 | | | | 200 | | | |
| Example 64 | | | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | SBA-1 | 10.0 | | | | | |
| Example 71 | | 15.0 | | | | | |
| Example 72 | | 20.0 | | | | | |
| Example 73 | MCM-41 | 1.0 | Yes | 1000 | TMABr | 12 | 120 |
| Example 74 | | | | 500 | | | |
| Example 75 | | | | 200 | | | |
| Example 76 | | | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.2 | | | | | |
| Example 83 | | 15.3 | | | | | |
| Example 84 | | 20.4 | | | | | |
| Example 85 | MCM-41 | 1.0 | None | 1000 | | | |
| Example 86 | | | | 500 | | | |
| Example 87 | | | | 200 | | | |
| Example 88 | | | | 100 | | | |
| Example 89 | | 1.5 | | | | | |
| Example 90 | | 1.8 | | | | | |
| Example 91 | | 2.0 | | | | | |
| Example 92 | | 2.5 | | | | | |
| Example 93 | | 5.1 | | | | | |
| Example 94 | SBA-1 | 10.2 | | | | | |
| Example 95 | | 15.3 | | | | | |
| Example 96 | | 20.4 | | | | | |

| | Functional Structural Body | | | | | | |
|---|---|---|---|---|---|---|---|
| | Skeletal body Zeolite-Type Compound | | Functional Substance Solid acid Nanoparticles | | | Performance Evaluation | |
| No. | Framework | Average Inner Diameter $D_F$ of Channels (nm) | Type | Average particle size $D_C$ (nm) | $D_C/D_F$ | Catalytic Activity | Durability |
| Example 49 | MFI | 0.56 | $ZnO_x$ | 0.10 | 0.2 | C | C |
| Example 50 | | | | 0.30 | 0.5 | C | C |
| Example 51 | | | | 0.50 | 0.9 | B | C |
| Example 52 | | | | 1.00 | 1.8 | A | B |

TABLE 2-continued

|  |  |  |  |  |  |
|---|---|---|---|---|---|
| Example 53 |  |  | 1.50 | 2.7 | A | B |
| Example 54 |  |  | 1.80 | 3.2 | A | A |
| Example 55 |  |  | 2.00 | 3.6 | A | A |
| Example 56 |  |  | 2.50 | 4.5 | A | A |
| Example 57 |  |  | 5.00 | 8.9 | B | A |
| Example 58 |  |  | 10.00 | 17.9 | B | A |
| Example 59 |  |  | 15.00 | 26.8 | C | A |
| Example 60 |  |  | 20.00 | 35.7 | C | A |
| Example 61 |  |  | 0.10 | 0.2 | C | C |
| Example 62 |  |  | 0.30 | 0.5 | C | C |
| Example 63 |  |  | 0.50 | 0.9 | B | C |
| Example 64 |  |  | 1.00 | 1.8 | A | B |
| Example 65 |  |  | 1.50 | 2.7 | A | B |
| Example 66 |  |  | 1.80 | 3.2 | B | A |
| Example 67 |  |  | 2.00 | 3.6 | B | A |
| Example 68 |  |  | 2.50 | 4.5 | B | A |
| Example 69 |  |  | 5.00 | 8.9 | C | A |
| Example 70 |  |  | 10.00 | 17.9 | C | A |
| Example 71 |  |  | 15.00 | 26.8 | C | A |
| Example 72 |  |  | 20.00 | 35.7 | C | A |
| Example 73 | FER | 0.57 | 0.10 | 0.2 | C | C |
| Example 74 |  |  | 0.31 | 0.5 | C | C |
| Example 75 |  |  | 0.51 | 0.9 | B | C |
| Example 76 |  |  | 1.02 | 1.8 | A | B |
| Example 77 |  |  | 1.53 | 2.7 | A | B |
| Example 78 |  |  | 1.83 | 3.2 | A | B |
| Example 79 |  |  | 2.04 | 3.6 | A | A |
| Example 80 |  |  | 2.54 | 4.5 | A | A |
| Example 81 |  |  | 5.09 | 8.9 | B | A |
| Example 82 |  |  | 10.18 | 17.9 | B | A |
| Example 83 |  |  | 15.27 | 26.8 | C | A |
| Example 84 |  |  | 20.36 | 35.7 | C | A |
| Example 85 |  |  | 0.10 | 0.2 | C | C |
| Example 86 |  |  | 0.31 | 0.5 | C | C |
| Example 87 |  |  | 0.51 | 0.9 | B | C |
| Example 88 |  |  | 1.02 | 1.8 | A | B |
| Example 89 |  |  | 1.53 | 2.7 | A | B |
| Example 90 |  |  | 1.83 | 3.2 | A | B |
| Example 91 |  |  | 2.04 | 3.6 | B | A |
| Example 92 |  |  | 2.54 | 4.5 | B | A |
| Example 93 |  |  | 5.09 | 8.9 | C | A |
| Example 94 |  |  | 10.18 | 17.9 | C | A |
| Example 95 |  |  | 15.27 | 26.8 | C | A |
| Example 96 |  |  | 20.36 | 35.7 | C | A |

TABLE 3

Making Conditions for Functional Structural Body

| No. | Precursor Material (A) | | Addition to Precursor Material (A) | | Hydrothermal Treatment Conditions for Precursor Material (C) | | |
|---|---|---|---|---|---|---|---|
|  | Type | Pore Diameter (nm) | Presence or Absence of Additives | Conversion Ratio of Added Amount of Metal Containing Solution | Type of Structure Directing agent | pH | Time (h) |
| Example 97 | MCM-41 | 1.3 | Yes | 1000 | TEABr | 12 | 120 |
| Example 98 |  |  |  | 500 |  |  |  |
| Example 99 |  |  |  | 200 |  |  |  |
| Example 100 |  |  |  | 100 |  |  |  |
| Example 101 |  | 2.0 |  |  |  |  |  |
| Example 102 |  | 2.4 |  |  |  |  |  |
| Example 103 |  | 2.6 |  |  |  |  |  |
| Example 104 |  | 3.3 |  |  |  |  |  |
| Example 105 |  | 6.6 |  |  |  |  |  |
| Example 106 | SBA-1 | 13.2 |  |  |  |  |  |
| Example 107 |  | 19.8 |  |  |  |  |  |
| Example 108 |  | 26.4 |  |  |  |  |  |
| Example 109 | MCM-41 | 1.3 | None | 1000 |  |  |  |
| Example 110 |  |  |  | 500 |  |  |  |
| Example 111 |  |  |  | 200 |  |  |  |
| Example 112 |  |  |  | 100 |  |  |  |
| Example 113 |  | 2.0 |  |  |  |  |  |

TABLE 3-continued

| No. | | | | | | |
|---|---|---|---|---|---|---|
| Example 114 | | 2.4 | | | | |
| Example 115 | | 2.6 | | | | |
| Example 116 | | 3.3 | | | | |
| Example 117 | | 6.6 | | | | |
| Example 118 | SBA-1 | 13.2 | | | | |
| Example 119 | | 19.8 | | | | |
| Example 120 | | 26.4 | | | | |
| Example 121 | MCM- | 1.1 | Yes | 1000 | 11 | 72 |
| Example 122 | 41 | | | 500 | | |
| Example 123 | | | | 200 | | |
| Example 124 | | | | 100 | | |
| Example 125 | | 1.6 | | | | |
| Example 126 | | 2.0 | | | | |
| Example 127 | | 2.2 | | | | |
| Example 128 | | 2.7 | | | | |
| Example 129 | | 5.4 | | | | |
| Example 130 | SBA-1 | 10.9 | | | | |
| Example 131 | | 16.3 | | | | |
| Example 132 | | 21.8 | | | | |
| Example 133 | MCM- | 1.1 | None | 1000 | | |
| Example 134 | 41 | | | 500 | | |
| Example 135 | | | | 200 | | |
| Example 136 | | | | 100 | | |
| Example 137 | | 1.6 | | | | |
| Example 138 | | 2.0 | | | | |
| Example 139 | | 2.2 | | | | |
| Example 140 | | 2.7 | | | | |
| Example 141 | | 5.4 | | | | |
| Example 142 | SBA-1 | 10.9 | | | | |
| Example 143 | | 16.3 | | | | |
| Example 144 | | 21.8 | | | | |

| | Functional Structural Body | | | | | |
|---|---|---|---|---|---|---|
| | Skeletal body Zeolite-Type Compound | | Functional Substance Solid acid Nanoparticles | | Performance Evaluation | |
| No. | Framework | Average Inner Diameter $D_F$ of Channels (nm) | Type | Average particle size $D_C$ (nm) | $D_C/D_F$ | Catalytic Activity | Durability |
| Example 97 | FAU | 0.74 | $AlO_x$ | 0.13 | 0.2 | C | C |
| Example 98 | | | | 0.40 | 0.5 | C | C |
| Example 99 | | | | 0.66 | 0.9 | B | C |
| Example 100 | | | | 1.32 | 1.8 | A | B |
| Example 101 | | | | 1.98 | 2.7 | A | B |
| Example 102 | | | | 2.38 | 3.2 | A | A |
| Example 103 | | | | 2.64 | 3.6 | A | A |
| Example 104 | | | | 3.30 | 4.5 | A | A |
| Example 105 | | | | 6.61 | 8.9 | B | A |
| Example 106 | | | | 13.21 | 17.9 | B | A |
| Example 107 | | | | 19.82 | 26.8 | C | A |
| Example 108 | | | | 26.43 | 35.7 | C | A |
| Example 109 | | | | 0.13 | 0.2 | C | C |
| Example 110 | | | | 0.40 | 0.5 | C | C |
| Example 111 | | | | 0.66 | 0.9 | B | C |
| Example 112 | | | | 1.32 | 1.8 | A | B |
| Example 113 | | | | 1.98 | 2.7 | A | B |
| Example 114 | | | | 2.38 | 3.2 | B | A |
| Example 115 | | | | 2.64 | 3.6 | B | A |
| Example 116 | | | | 3.30 | 4.5 | B | A |
| Example 117 | | | | 6.61 | 8.9 | C | A |
| Example 118 | | | | 13.21 | 17.9 | C | A |
| Example 119 | | | | 19.82 | 26.8 | C | A |
| Example 120 | | | | 26.43 | 35.7 | C | A |
| Example 121 | MTW | 0.61 | | 0.11 | 0.2 | C | C |
| Example 122 | | | | 0.33 | 0.5 | C | C |
| Example 123 | | | | 0.54 | 0.9 | B | C |
| Example 124 | | | | 1.09 | 1.8 | A | B |
| Example 125 | | | | 1.63 | 2.7 | A | B |
| Example 126 | | | | 1.96 | 3.2 | A | B |
| Example 127 | | | | 2.18 | 3.6 | A | A |
| Example 128 | | | | 2.72 | 4.5 | A | A |
| Example 129 | | | | 5.45 | 8.9 | B | A |
| Example 130 | | | | 10.89 | 17.9 | B | A |
| Example 131 | | | | 16.34 | 26.8 | C | A |

TABLE 3-continued

| | | | | | |
|---|---|---|---|---|---|
| Example 132 | | 21.79 | 35.7 | C | A |
| Example 133 | | 0.11 | 0.2 | C | C |
| Example 134 | | 0.33 | 0.5 | C | C |
| Example 135 | | 0.54 | 0.9 | B | C |
| Example 136 | | 1.09 | 1.8 | A | B |
| Example 137 | | 1.63 | 2.7 | A | B |
| Example 138 | | 1.96 | 3.2 | A | B |
| Example 139 | | 2.18 | 3.6 | B | A |
| Example 140 | | 2.72 | 4.5 | B | A |
| Example 141 | | 5.45 | 8.9 | C | A |
| Example 142 | | 10.89 | 17.9 | C | A |
| Example 143 | | 16.34 | 26.8 | C | A |
| Example 144 | | 21.79 | 35.7 | C | A |

TABLE 4

Making Conditions for Functional Structural Body

| | Precursor Material (A) | | Addition to Precursor Material (A) | | Hydrothermal Treatment Conditions for Precursor Material (C) | | |
|---|---|---|---|---|---|---|---|
| No. | Type | Pore Diameter (nm) | Presence or Absence of Additives | Added Amount of Metal Containing Solution | Conversion Ratio of Type of Structure Directing agent | pH | Time (h) |
| Example 145 | MCM-41 | 1.0 | Yes | 1000 | TPABr | 12 | 72 |
| Example 146 | | | | 500 | | | |
| Example 147 | | | | 200 | | | |
| Example 148 | | | | 100 | | | |
| Example 149 | | 1.5 | | | | | |
| Example 150 | | 1.8 | | | | | |
| Example 151 | | 2.0 | | | | | |
| Example 152 | | 2.5 | | | | | |
| Example 153 | | 5.0 | | | | | |
| Example 154 | SBA-1 | 10.0 | | | | | |
| Example 155 | | 15.0 | | | | | |
| Example 156 | | 20.0 | | | | | |
| Example 157 | MCM-41 | 1.0 | None | 1000 | | | |
| Example 158 | | | | 500 | | | |
| Example 159 | | | | 200 | | | |
| Example 160 | | | | 100 | | | |
| Example 161 | | 1.5 | | | | | |
| Example 162 | | 1.8 | | | | | |
| Example 163 | | 2.0 | | | | | |
| Example 164 | | 2.5 | | | | | |
| Example 165 | | 5.0 | | | | | |
| Example 166 | SBA-1 | 10.0 | | | | | |
| Example 167 | | 15.0 | | | | | |
| Example 168 | | 20.0 | | | | | |
| Example 169 | MCM-41 | 1.0 | Yes | 1000 | TMABr | 12 | 120 |
| Example 170 | | | | 500 | | | |
| Example 171 | | | | 200 | | | |
| Example 172 | | | | 100 | | | |
| Example 173 | | 1.5 | | | | | |
| Example 174 | | 1.8 | | | | | |
| Example 175 | | 2.0 | | | | | |
| Example 176 | | 2.5 | | | | | |
| Example 177 | | 5.1 | | | | | |
| Example 178 | SBA-1 | 10.2 | | | | | |
| Example 179 | | 15.3 | | | | | |
| Example 180 | | 20.4 | | | | | |
| Example 181 | MCM-41 | 1.0 | None | 1000 | | | |
| Example 182 | | | | 500 | | | |
| Example 183 | | | | 200 | | | |
| Example 184 | | | | 100 | | | |
| Example 185 | | 1.5 | | | | | |
| Example 186 | | 1.8 | | | | | |
| Example 187 | | 2.0 | | | | | |
| Example 188 | | 2.5 | | | | | |
| Example 189 | | 5.1 | | | | | |

TABLE 4-continued

| | | |
|---|---|---|
| Example 190 | SBA-1 | 10.2 |
| Example 191 | | 15.0 |
| Example 192 | | 20.0 |

| | Functional Structural Body | | | | | |
|---|---|---|---|---|---|---|
| | Skeletal body Zeolite-Type Compound | | Functional Substance Solid acid Nanoparticles | | Performance Evaluation | |
| No. | Framework | Average Inner Diameter $D_F$ of Channels (nm) | Type | Average particle size $D_C$ (nm) | $D_C/D_F$ | Catalytic Activity | Durability |
|---|---|---|---|---|---|---|---|
| Example 145 | MFI | 0.56 | $AlO_x$ | 0.10 | 0.2 | C | C |
| Example 146 | | | | 0.30 | 0.5 | C | C |
| Example 147 | | | | 0.50 | 0.9 | B | C |
| Example 148 | | | | 1.00 | 1.8 | A | B |
| Example 149 | | | | 1.50 | 2.7 | A | B |
| Example 150 | | | | 1.80 | 3.2 | A | A |
| Example 151 | | | | 2.00 | 3.6 | A | A |
| Example 152 | | | | 2.50 | 4.5 | A | A |
| Example 153 | | | | 5.00 | 8.9 | B | A |
| Example 154 | | | | 10.00 | 17.9 | B | A |
| Example 155 | | | | 15.00 | 26.8 | C | A |
| Example 156 | | | | 20.00 | 35.7 | C | A |
| Example 157 | | | | 0.10 | 0.2 | C | C |
| Example 158 | | | | 0.30 | 0.5 | C | C |
| Example 159 | | | | 0.50 | 0.9 | B | C |
| Example 160 | | | | 1.00 | 1.8 | A | B |
| Example 161 | | | | 1.50 | 2.7 | A | B |
| Example 162 | | | | 1.80 | 3.2 | B | A |
| Example 163 | | | | 2.00 | 3.6 | B | A |
| Example 164 | | | | 2.50 | 4.5 | B | A |
| Example 165 | | | | 5.00 | 8.9 | C | A |
| Example 166 | | | | 10.00 | 17.9 | C | A |
| Example 167 | | | | 15.00 | 26.8 | C | A |
| Example 168 | | | | 20.00 | 35.7 | C | A |
| Example 169 | FER | 0.57 | | 0.10 | 0.2 | C | C |
| Example 170 | | | | 0.31 | 0.5 | C | C |
| Example 171 | | | | 0.51 | 0.9 | B | C |
| Example 172 | | | | 1.02 | 1.8 | A | B |
| Example 173 | | | | 1.53 | 2.7 | A | B |
| Example 174 | | | | 1.83 | 3.2 | A | B |
| Example 175 | | | | 2.04 | 3.6 | A | A |
| Example 176 | | | | 2.54 | 4.5 | A | A |
| Example 177 | | | | 5.09 | 8.9 | B | A |
| Example 178 | | | | 10.18 | 17.9 | B | A |
| Example 179 | | | | 15.27 | 26.8 | C | A |
| Example 180 | | | | 20.36 | 35.7 | C | A |
| Example 181 | | | | 0.10 | 0.2 | C | C |
| Example 182 | | | | 0.31 | 0.5 | C | C |
| Example 183 | | | | 0.51 | 0.9 | B | C |
| Example 184 | | | | 1.02 | 1.8 | A | B |
| Example 185 | | | | 1.53 | 2.7 | A | B |
| Example 186 | | | | 1.83 | 3.2 | A | B |
| Example 187 | | | | 2.04 | 3.6 | B | A |
| Example 188 | | | | 2.54 | 4.5 | B | A |
| Example 189 | | | | 5.09 | 8.9 | C | A |
| Example 190 | | | | 10.18 | 17.9 | C | A |
| Example 191 | | 0.56 | | 15.00 | 26.8 | C | A |
| Example 192 | | | | 20.00 | 35.7 | C | A |

TABLE 5

| | Making Conditions for Functional Structural Body ||||||
|---|---|---|---|---|---|---|
| | Precursor Material (A) || Addition to Precursor Material (A) || Hydrothermal Treatment Conditions for Precursor Material (C) ||
| No. | Type | Pore Diameter (nm) | Presence or Absence of Additives | Conversion Ratio of Added Amount of Metal Containing Solution | Type of Structure Directing agent | pH | Time (h) |
| Example 193 | MCM-41 | 1.3 | Yes | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| Example 203 | | 19.8 | | | | | |
| Example 204 | | 26.4 | | | | | |
| Example 205 | MCM-41 | 1.3 | None | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |
| Example 213 | | 6.6 | | | | | |
| Example 214 | SBA-1 | 13.2 | | | | | |
| Example 215 | | 19.8 | | | | | |
| Example 216 | | 26.4 | | | | | |
| Example 217 | MCM-41 | 1.1 | Yes | 1000 | | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | None | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |
| Example 239 | | 16.3 | | | | | |
| Example 240 | | 21.8 | | | | | |

| | Functional Structural Body ||||||| 
|---|---|---|---|---|---|---|---|
| | Skeletal body Zeolite-Type Compound || Functional Substance Solid acid Nanoparticles ||| Performance Evaluation ||
| | | Average Inner Diameter $D_F$ of Channels (nm) | | Average particle size $D_C$ (nm) | | Catalytic | |
| No. | Framework | | Type | | $D_C/D_F$ | Activity | Durability |
| Example 193 | FAU | 0.74 | $ZrO_x$ | 0.13 | 0.2 | C | C |
| Example 194 | | | | 0.40 | 0.5 | C | C |
| Example 195 | | | | 0.66 | 0.9 | B | C |
| Example 196 | | | | 1.32 | 1.8 | A | B |
| Example 197 | | | | 1.98 | 2.7 | A | B |

TABLE 5-continued

| | | | | | |
|---|---|---|---|---|---|
| Example 198 | | | 2.38 | 3.2 | A | A |
| Example 199 | | | 2.64 | 3.6 | A | A |
| Example 200 | | | 3.30 | 4.5 | A | A |
| Example 201 | | | 6.61 | 8.9 | B | A |
| Example 202 | | | 13.21 | 17.9 | B | A |
| Example 203 | | | 19.82 | 26.8 | C | A |
| Example 204 | | | 26.43 | 35.7 | C | A |
| Example 205 | | | 0.13 | 0.2 | C | C |
| Example 206 | | | 0.40 | 0.5 | C | C |
| Example 207 | | | 0.66 | 0.9 | B | C |
| Example 208 | | | 1.32 | 1.8 | A | B |
| Example 209 | | | 1.98 | 2.7 | A | B |
| Example 210 | | | 2.38 | 3.2 | B | A |
| Example 211 | | | 2.64 | 3.6 | B | A |
| Example 212 | | | 3.30 | 4.5 | B | A |
| Example 213 | | | 6.61 | 8.9 | C | A |
| Example 214 | | | 13.21 | 17.9 | C | A |
| Example 215 | | | 19.82 | 26.8 | C | A |
| Example 216 | | | 26.43 | 35.7 | C | A |
| Example 217 | MTW | 0.61 | 0.11 | 0.2 | C | C |
| Example 218 | | | 0.33 | 0.5 | C | C |
| Example 219 | | | 0.54 | 0.9 | B | C |
| Example 220 | | | 1.09 | 1.8 | A | B |
| Example 221 | | | 1.63 | 2.7 | A | B |
| Example 222 | | | 1.96 | 3.2 | A | B |
| Example 223 | | | 2.18 | 3.6 | A | A |
| Example 224 | | | 2.72 | 4.5 | A | A |
| Example 225 | | | 5.45 | 8.9 | B | A |
| Example 226 | | | 10.89 | 17.9 | B | A |
| Example 227 | | | 16.34 | 26.8 | C | A |
| Example 228 | | | 21.79 | 35.7 | C | A |
| Example 229 | | | 0.11 | 0.2 | C | C |
| Example 230 | | | 0.33 | 0.5 | C | C |
| Example 231 | | | 0.54 | 0.9 | B | C |
| Example 232 | | | 1.09 | 1.8 | A | B |
| Example 233 | | | 1.63 | 2.7 | A | B |
| Example 234 | | | 1.96 | 3.2 | A | B |
| Example 235 | | | 2.18 | 3.6 | B | A |
| Example 236 | | | 2.72 | 4.5 | B | A |
| Example 237 | | | 5.45 | 8.9 | C | A |
| Example 238 | | | 10.89 | 17.9 | C | A |
| Example 239 | | | 16.34 | 26.8 | C | A |
| Example 240 | | | 21.79 | 35.7 | C | A |

TABLE 6

| | Making Conditions for Functional Structural Body | | | | | | |
|---|---|---|---|---|---|---|---|
| | Precursor Material (A) | | Addition to Precursor Material (A) | | Hydrothermal Treatment Conditions for Precursor Material (C) | | |
| No. | Type | Pore Diameter (nm) | Presence or Absence of Additives | Conversion Ratio of Added Amount of Metal Containing Solution | Type of Structure Directing agent | pH | Time (h) |
| Example 241 | MCM-41 | 1.0 | Yes | 1000 | TPABr | 12 | 72 |
| Example 242 | | | | 500 | | | |
| Example 243 | | | | 200 | | | |
| Example 244 | | | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | None | 1000 | | | |
| Example 254 | | | | 500 | | | |
| Example 255 | | | | 200 | | | |
| Example 256 | | | | 100 | | | |
| Example 257 | | 1.5 | | | | | |
| Example 258 | | 1.8 | | | | | |

TABLE 6-continued

| No. | | | | | | | |
|---|---|---|---|---|---|---|---|
| Example 259 | | 2.0 | | | | | |
| Example 260 | | 2.5 | | | | | |
| Example 261 | | 5.0 | | | | | |
| Example 262 | SBA-1 | 10.0 | | | | | |
| Example 263 | | 15.0 | | | | | |
| Example 264 | | 20.0 | | | | | |
| Example 265 | MCM-41 | 1.0 | Yes | 1000 | TMABr | 12 | 120 |
| Example 266 | | | | 500 | | | |
| Example 267 | | | | 200 | | | |
| Example 268 | | | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.2 | | | | | |
| Example 275 | | 15.3 | | | | | |
| Example 276 | | 20.4 | | | | | |
| Example 277 | MCM-41 | 1.0 | None | 1000 | | | |
| Example 278 | | | | 500 | | | |
| Example 279 | | | | 200 | | | |
| Example 280 | | | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.2 | | | | | |
| Example 287 | | 15.3 | | | | | |
| Example 288 | | 20.4 | | | | | |
| Comparative Example 1 | | | | — | | | |
| Comparative Example 2 | | | | — | | | |

| | Functional Structural Body | | | | | | |
|---|---|---|---|---|---|---|---|
| | Skeletal body Zeolite-Type Compound | | Functional Substance Solid acid Nanoparticles | | | Performance Evaluation | |
| No. | Framework | Average Inner Diameter $D_F$ of Channels (nm) | Type | Average particle size $D_C$ (nm) | $D_C/D_F$ | Catalytic Activity | Durability |
| Example 241 | MFI | 0.56 | ZrO$_x$ | 0.10 | 0.2 | C | C |
| Example 242 | | | | 0.30 | 0.5 | C | C |
| Example 243 | | | | 0.50 | 0.9 | B | C |
| Example 244 | | | | 1.00 | 1.8 | A | B |
| Example 245 | | | | 1.50 | 2.7 | A | B |
| Example 246 | | | | 1.80 | 3.2 | A | A |
| Example 247 | | | | 2.00 | 3.6 | A | A |
| Example 248 | | | | 2.50 | 4.5 | A | A |
| Example 249 | | | | 5.00 | 8.9 | B | A |
| Example 250 | | | | 10.00 | 17.9 | B | A |
| Example 251 | | | | 15.00 | 26.8 | C | A |
| Example 252 | | | | 25.00 | 44.6 | C | A |
| Example 253 | | | | 0.10 | 0.2 | C | C |
| Example 254 | | | | 0.30 | 0.5 | C | C |
| Example 255 | | | | 0.50 | 0.9 | B | C |
| Example 256 | | | | 1.00 | 1.8 | A | B |
| Example 257 | | | | 1.50 | 2.7 | A | B |
| Example 258 | | | | 1.80 | 3.2 | B | A |
| Example 259 | | | | 2.00 | 3.6 | B | A |
| Example 260 | | | | 2.50 | 4.5 | B | A |
| Example 261 | | | | 5.00 | 8.9 | C | A |
| Example 262 | | | | 10.00 | 17.9 | C | A |
| Example 263 | | | | 15.00 | 26.8 | C | A |
| Example 264 | | | | 20.00 | 35.7 | C | A |
| Example 265 | FER | 0.57 | | 0.10 | 0.2 | C | C |
| Example 266 | | | | 0.31 | 0.5 | C | C |
| Example 267 | | | | 0.51 | 0.9 | B | C |
| Example 268 | | | | 1.02 | 1.8 | A | B |
| Example 269 | | | | 1.53 | 2.7 | A | B |
| Example 270 | | | | 1.83 | 3.2 | A | B |
| Example 271 | | | | 2.04 | 3.6 | A | A |

TABLE 6-continued

| | | | | | | |
|---|---|---|---|---|---|---|
| Example 272 | | | | 2.54 | 4.5 | A | A |
| Example 273 | | | | 5.09 | 8.9 | B | A |
| Example 274 | | | | 10.18 | 17.9 | B | A |
| Example 275 | | | | 15.27 | 26.8 | C | A |
| Example 276 | | | | 20.36 | 35.7 | C | A |
| Example 277 | | | | 0.10 | 0.2 | C | C |
| Example 278 | | | | 0.31 | 0.5 | C | C |
| Example 279 | | | | 0.51 | 0.9 | B | C |
| Example 280 | | | | 1.02 | 1.8 | A | B |
| Example 281 | | | | 1.53 | 2.7 | A | B |
| Example 282 | | | | 1.83 | 3.2 | A | B |
| Example 283 | | | | 2.04 | 3.6 | B | A |
| Example 284 | | | | 2.54 | 4.5 | B | A |
| Example 285 | | | | 5.09 | 8.9 | C | A |
| Example 286 | | | | 10.18 | 17.9 | C | A |
| Example 287 | | | | 15.27 | 26.8 | C | A |
| Example 288 | | | | 20.36 | 35.7 | C | A |
| Comparative Example 1 | MFI Type Silicalite | 0.56 | $CoO_x$ | ≤50 | ≤67.6 | C | D |
| Comparative Example 2 | MFI Type Silicalite | 0.56 | | | | D | D |

As can be seen from Tables 1 to 6, the functional structural bodies (Examples 1 to 288), which were confirmed by cross sectional observation to retain the solid acid nanoparticles inside the skeletal bodies, were found to exhibit excellent catalytic activity in the decomposition reaction of butylbenzene and excellent durability as a catalyst compared to the functional structural body in which the solid acid nanoparticles are adhered to the outer surface of the skeletal body only (Comparative Example 1) or the skeletal body itself without any functional substances (Comparative Example 2).

In addition, the relationship between the amount of metal embedded in the skeletal body (mass %) of the functional structural body measured in the evaluation [C], and the yield (mol %) of a compound having a molecular weight smaller than that of butylbenzene contained in the generated liquid was evaluated. The evaluation method was the same as the evaluation method performed in "(1) catalytic activity" in the [D] "performance evaluation" described above.

As a result, in each Example, when the added amount of the metal containing solution added to the precursor material (A), in terms of the ratio of number of atoms Si/M (M=Zr) is 50 to 200 (content of the metal element (M) of the solid acid relative to the functional structural body is 0.5 to 2.5 mass %), the yield of the compound having a molecular weight lower than that of butylbenzene contained in the generated liquid was 32 mol % or greater, and the catalytic activity in the decomposition reaction of butylbenzene was found to be greater than or equal to the pass level.

On the other hand, in the functional structural body of Comparative Example 1 in which the solid acid nanoparticles were attached to the outer surface of the skeletal body only, the catalytic activity in the decomposition reaction of butylbenzene was improved compared to the skeletal body itself of Comparative Example 2, which did not have any solid acid nanoparticles, but durability as a catalyst was inferior to the functional structural body of Examples 1 to 288.

In addition, the skeletal body itself of Comparative Example 2, which did not have any functional substances, exhibited little catalytic activity in the decomposition reaction of butylbenzene, and both the catalytic activity and the durability were inferior to the functional structural body of Examples 1 to 288.

REFERENCE SIGNS LIST 1,2 Functional Structural Body
10 Skeletal Body
10a Outer Surface
11 Channel
11a Pore
12 Enlarged Pore Portion
20 Solid Acid
30 Functional Substance

What is claimed is:

1. A structural body, comprising:
   a skeletal body of a porous structure composed of a zeolite-type compound; and
   at least one solid acid present in the skeletal body, wherein
      the zeolite-type compound is selected from the group consisting of zeolites, cation exchanged zeolites and silicalites,
      a framework of the zeolite-type compound is selected from the group consisting of FAU type (Y type or X type), MTW type, MFI type (ZSM-5), FER type (ferrierite), LTA type (A type), MWW type (MCM-22), MOR type (mordenite), LTL type (L type), and BEA type (beta type),
      the skeletal body has channels connecting with each other,
      the solid acid is present at least in the channels of the skeletal body,
      the solid acid is selected from the group consisting of iron oxide ($FeO_x$), zinc oxide (ZnO), aluminum oxide ($Al_2O_3$), zirconium oxide ($ZrO_2$), titanium oxide ($TiO_2$), selenium trioxide ($SeO_3$), selenium dioxide ($SeO_2$), tellurium trioxide ($TeO_3$), tellurium dioxide ($TeO_2$), tin dioxide ($SnO_2$), manganese oxide ($Mn_2O_7$), technetium oxide ($Tc_2O_7$), and rhenium oxide ($Re_2O_7$),
      the channels have any one of a one-dimensional pore, a two-dimensional pore, and a three-dimensional pore defined by the framework of the zeolite-type compound and an enlarged pore portion which has a diameter greater than any one of the one-dimensional pore, the two-dimensional pore, and the three-dimensional pore, the enlarged pore portion is not defined by the framework of the zeolite-type compound, and is greater than or equal to a diameter of the solid acid, the solid acid is at least embedded in the enlarged pore portion, an average particle size of the solid acid is greater than any one of the one-dimensional pore, the two-dimensional pore, and the three-dimensional pore defined by the framework of the zeolite-type compound, and the solid acid is nanoparticles.

2. The structural body according to claim 1, wherein the enlarged pore portion causes a plurality of pores constituting any one of the one-dimensional pore, the two-dimensional pore, and the three-dimensional pore to connect with each other.

3. The structural body according to claim 1, wherein an average particle size of the nanoparticles is greater than an average inner diameter of the channel and is less than or equal to the inner diameter of the enlarged pore portion.

4. The structural body according to claim 1, wherein an average particle size of the nanoparticles is from 0.1 nm to 50 nm.

5. The structural body according to claim 4, wherein the average particle size of the nanoparticles is from 0.45 nm to 14.0 nm.

6. The structural body according to claim 1, wherein a ratio of an average particle size of the nanoparticles to an average inner diameter of the channels is from 0.06 to 500.

7. The structural body according to claim 6, Wherein the ratio of the average particle size of the nanoparticles to the average inner diameter of the channels is from 0.1 to 36.

8. The structural body according to claim 7, wherein the ratio of the average particle size of the nanoparticles to the average inner diameter of the channels is from 1.7 to 4.5.

9. The structural body according to claim 1, wherein a metal element of solid acid is contained in an amount of 0.5 mass % to 2.5 mass % based on the structural body.

10. The structural body according to claim 1, wherein an average inner diameter of the channel, is from 0.1 nm to 1.5 nm, and the inner diameter of the enlarged pore portion is from 0.5 nm to 50 nm.

11. The structural body according to claim 1, further including at least one catalytic substance held on an outer surface of the skeletal body.

12. The structural body according to claim 11, wherein a content of the at least one solid acid present in the skeletal body is greater than that of the at least one catalytic substance held on the outer surface of the skeletal body.

13. The structural body according to claim 1, wherein the zeolite-type compound comprises a plurality of pores less than 1 nm in diameter.

* * * * *